(12) United States Patent
Leung et al.

(10) Patent No.: US 8,423,660 B2
(45) Date of Patent: *Apr. 16, 2013

(54) DATACASTING SYSTEM WITH HIERARCHICAL DELIVERY QUALITY OF SERVICE MANAGEMENT CAPABILITY

(75) Inventors: Yiu Man Leung, Franklin Township, NJ (US); Xiaofeng Liu, Cary, NC (US); Peter Andrew Mataga, Sparta, NJ (US); Igor Slepchin, Caldwell, NJ (US)

(73) Assignee: Roundbox, Inc., Forham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,129

(22) Filed: May 11, 2012

(65) Prior Publication Data

US 2012/0226816 A1     Sep. 6, 2012

Related U.S. Application Data

(63) Continuation of application No. 12/711,220, filed on Feb. 23, 2010, now abandoned, which is a continuation-in-part of application No. 12/436,724, filed on May 6, 2009, now Pat. No. 8,127,041, said application No. 13/470,129 is a continuation-in-part of application No. 12/436,706, filed on May 6, 2009, now Pat. No. 8,311,048, which is a continuation-in-part of application No. 13/355,421, filed on Jan. 20, 2012, now Pat. No. 8,325,747, which is a continuation of application No. 12/022,914, filed on Jan. 30, 2008, now Pat. No. 8,102,864, which is a continuation-in-part of application No. 11/626,707, filed on Jan. 24, 2007, now Pat. No. 8,149, 771.

(60) Provisional application No. 61/097,640, filed on Sep. 17, 2008, provisional application No. 61/052,163, filed on May 9, 2008, provisional application No. 60/763,385, filed on Jan. 31, 2006, provisional application No. 60/816, 322, filed on Jun. 26, 2006, provisional application No. 60/868,868, filed on Dec. 6, 2006.

(51) Int. Cl.
*G06F 15/16* (2006.01)

(52) U.S. Cl.
USPC .......... 709/231; 709/219; 709/223; 370/270; 370/312; 370/469; 725/25; 725/37; 725/100

(58) Field of Classification Search ................... 709/231, 709/232, 217, 219, 235, 223, 224; 370/270, 370/252, 312, 328, 401, 469; 725/25, 32, 725/37, 78, 100, 116, 131
See application file for complete search history.

(56) References Cited

U.S. PATENT DOCUMENTS

| 8,127,041 B2* | 2/2012 | Leung et al. ................ 709/235 |
| 8,149,771 B2* | 4/2012 | Khivesara et al. .......... 370/329 |

(Continued)

*Primary Examiner* — Lashonda Jacobs
(74) *Attorney, Agent, or Firm* — Kilpatrick Townsend & Stockton LLP

(57) ABSTRACT

Datacasting systems may include one or more compound carousels each managing one or more elementary carousels, and managed by a bandwidth manager. Subsets of compounds carousels may be identified, for example, according to priority levels. Bandwidth allocations may be determined for the compound carousels. For example, the bandwidth manager may utilize multiple bandwidth allocation cycles to determine the bandwidth allocations. The multiple bandwidth allocation cycles may form a sequence. Each bandwidth allocation cycle may at least partially allocate an available datacasting bandwidth resource to at least one of the identified subsets of the compound carousels. The allocations may be based at least in part on desired bandwidths determined by the compound carousels and/or one or more bandwidth guidelines of datacast sessions associated with the compound carousels.

20 Claims, 16 Drawing Sheets

U.S. PATENT DOCUMENTS

| | | |
|---|---|---|
| 8,201,208 B2 * | 6/2012 | Delpuch et al. ............... 725/119 |
| 2003/0048805 A1 * | 3/2003 | Yoshihara et al. ............ 370/468 |
| 2005/0071882 A1 * | 3/2005 | Rodriguez et al. .............. 725/95 |
| 2007/0033239 A1 * | 2/2007 | Beaule et al. ................. 707/205 |
| 2007/0180119 A1 * | 8/2007 | Khivesara et al. ............ 709/226 |
| 2008/0101460 A1 * | 5/2008 | Rodriguez ............... 375/240.01 |
| 2008/0287058 A1 | 11/2008 | Nahm et al. |
| 2009/0025027 A1 * | 1/2009 | Craner ............................ 725/32 |
| 2009/0313383 A1 * | 12/2009 | Leung et al. ................... 709/235 |
| 2010/0037262 A1 * | 2/2010 | Heuer .............................. 725/50 |
| 2011/0138379 A1 * | 6/2011 | Porter et al. .................. 717/177 |
| 2011/0231888 A1 * | 9/2011 | Sequeira ........................ 725/116 |
| 2011/0305451 A1 * | 12/2011 | Nishitani et al. ................ 398/25 |
| 2012/0230195 A1 * | 9/2012 | Khivesara et al. ............ 370/235 |

\* cited by examiner

DATACASTING SYSTEM WITH HIERARCHICAL DELIVERY QUALITY OF SERVICE MANAGEMENT CAPABILITY

CROSS-REFERENCES TO RELATED APPLICATIONS

This application is a continuation of U.S. application Ser. No. 12/711,220, filed Feb. 23, 2010, entitled "Datacasting System with Hierarchical Delivery Quality of Service Management Capability", which application is a Continuation-in-Part of U.S. application Ser. No. 12/436,724, filed May 6, 2009, entitled "Datacasting System with Automatic Delivery of Service Management Capability", which application claims the benefit of: (1) U.S. Provisional Application No. 61/097,740, filed Sep. 17, 2008, entitled "Datacasting System with Automatic Delivery of Service Management", and (2) U.S. Provisional Application No. 61/052,163, filed May 9, 2008, entitled "Datacasting System with Intermittent Listener". This application is also a Continuation-in-Part of U.S. application Ser. No. 12/436,706, filed May 6, 2009, entitled "Datacasting System with Intermittent Listener Capability", which application claims the benefit of U.S. Provisional Application No. 61/052,163, filed May 9, 2008, entitled "Datacasting System with Intermittent Listener". This application is also a Continuation-in-Part of U.S. application Ser. No. 13/355,421, filed Jan. 20, 2012, entitled "Location Specific Event Broadcasting", which application is a Continuation of U.S. application Ser. No. 12/022,914, filed Jan. 30, 2008, now issued U.S. Pat. No. 8,102,864, entitled "Location Specific Event Broadcasting", which is a Continuation-in-Part of U.S. application Ser. No. 11/626,707, filed Jan. 24, 2007, entitled "Reliable Event Broadcaster with Multiplexing and Bandwidth Control Functions", which claims the benefit of the following United States Patent Applications: (1) U.S. Provisional Application No. 60/763,385, filed Jan. 31, 2006, entitled "Reliable Event Stream Distributor; (2) U.S. Provisional Application No. 60/816,322, filed Jun. 26, 2006, entitled "Reliable Event Broadcaster; and (3) U.S. Provisional Application No. 60/868,868, filed Dec. 6, 2006, entitled "Reliable Event Broadcaster with Multiplexing and Bandwidth Control Functions". The contents of each application referenced in this paragraph are hereby incorporated in their entirety by reference.

BACKGROUND

A number of protocols exist that are designed to facilitate the distribution of data objects (e.g., files, notifications, events, etc.) over a unidirectional network (e.g., IP multicast or broadcast, unicast UDP networks). For simplicity, such networks will be referred to generically in this description as "datacast networks", and it will be understood that the term refers to the specific networks mentioned as well as similar data distribution networks. For packet-based technologies, the distribution of data objects involves object packetizing at the server (that is, breaking a data object into multiple smaller data packets), transmission over the network and reassembly of the data object from the packets at the client. The data objects are typically transmitted in the context of a logical session that is identified as part of the datacast protocol.

Datacasting algorithms typically take into account a number of constraints or operating conditions. First, there is typically limited bandwidth due to, for example, constraints imposed by the transmission technology or medium as well as by the transmission network operator.

Second, clients attempting to receive the packets may not receive all the packets, may not be continuously listening, or not be listening at the same time as one another. Both of these types of constraints become especially acute for wireless datacasting systems. In particular, wireless broadcast spectrum, and its associated bandwidth, are scarcer than other types of broadcast media. This scarcity often leads to tightly allocated usage of the broadcast spectrum, thus limiting overall bandwidth. Likewise, wireless clients are much less capable of listening in a continuous mode due to coverage problems or power consumption limitations.

One approach suited for file or data object distribution is to implement a datacast "carousel". As typically implemented, a carousel contains a set of data objects each of which is transmitted in turn one after the other in a cyclical fashion. Objects may be added to or removed from the carousel from time to time, but the carousel repeatedly cycles through the transmission of the objects. With this mode of operation, any client that joins a datacast in progress will acquire all the objects if it listens long enough. For certain simple applications where the set of objects on the carousel do not change often, such as for "offline file delivery" applications, this technique may be adequate to provide a desired level of service.

One approach that that has been tried for improving the operating characteristics of a simple data carousel is to implement a "fast" and a "slow" carousel for file transmission. In this approach, the data objects are divided into two subsets based on a partitioning criterion such as validity time or priority. One subset, typically a relatively small one (one day out of a weekly schedule, for example) is inserted into the "fast" carousel which provides a faster transmission while the rest of the data objects are inserted into a "slow" carousel which provides a slower transmission. One of the disadvantages of this arrangement is that the bandwidth for the carousels is generally pre-allocated based on the amount of data the application anticipates will be in each subset. There is no automatic management of bandwidth or object allocation to carousels, and these parameters change only on occasions where the overall content of the set of carousels is changed.

Bandwidth utilization by the application and system is therefore not necessarily optimal using this approach. Another disadvantage of this arrangement is that the application providing the objects to be datacast may need to directly manage all aspects of this type of carousel, which makes the application more complicated to develop. Yet another disadvantage of this approach is that the corresponding client application may need to either listen to both carousels to get the complete set of data objects or be aware of some characteristic of the two carousels that enables the client application to more efficiently receive the desired objects. Typically, the client application directly manages this aspect of the listening behavior, so that it may require more complicated client application development. A further difficulty of this arrangement is that client applications generally are provided by multiple vendors; thus, making all client applications aware of the characteristics of the two carousels may require some form of coordination or standardization.

It may be desirable that a client application acquire the transmitted data objects in the shortest time; however the acquisition time is inversely related to the available transmission bandwidth. It may also be desirable to lower the processing requirements placed on the client application in order to preserve the battery life on the client device. As recognized by the inventors, existing approaches to the management of datacast services only effectively address certain types of static file or data object delivery sessions. In circumstances where the type and number of such objects changes over time and the available bandwidth is limited, it may be desirable for the object delivery quality of service (DQoS) to be managed more precisely, for example, to optimize the balance between the acquisition time and available transmission bandwidth, while allowing the client application to receive the object with the highest reliability (e.g., high probability) and minimal processing.

A particular bandwidth resource may be utilized by multiple datacast sessions. Some approaches to addressing the problems described above fail to perform effectively when considered from the perspective of the collection of multiple datacast sessions. For example, a change to bandwidth needs and/or desires within one datacast session may require a re-allocation of the bandwidth resource to maintain optimality with respect to various delivery quality of service goals. The multiple datacast sessions may be associated with multiple applications, and the applications may, in effect, compete for the bandwidth resource. Approaches attempting to delegate aspects of multiple datacast session optimization to the application level may be problematic, for example, due to unmanaged competition.

What is desired is a system, apparatus and method for more efficiently managing the distribution of data objects using a datacast system in the situation where the type and number of such objects changes over time, and which overcomes the noted disadvantages of present approaches to solving this problem. Embodiments of the invention are directed toward solving these and other problems individually and collectively.

BRIEF SUMMARY

Embodiments of the present invention are directed to datacasting systems, apparatuses, and methods. In some embodiments, exemplary datacasting systems may include one or more compound carousels each managing one or more elementary carousels, and managed by a bandwidth manager. Requests for bandwidth allocation may be made, for example, by the compound carousels to the bandwidth manager. Subsets of compound carousels may be identified, for example, according to priority levels. Bandwidth allocations may be determined for the compound carousels. For example, the bandwidth manager may utilize multiple bandwidth allocation cycles to determine the bandwidth allocations. The multiple bandwidth allocation cycles may form a sequence. Each bandwidth allocation cycle may at least partially allocate an available datacasting bandwidth resource to at least one of the identified subsets of the compound carousels. The allocations may be based at least in part on desired bandwidths determined by the compound carousels and/or one or more bandwidth guidelines of datacast sessions associated with the compound carousels. Notifications of determined bandwidth allocations may be issued, for example, by the bandwidth manager to the compound carousels.

Requests for bandwidth allocation may result in notifications issued to non-requesters. A compound carousel may distribute a given bandwidth allocation among its component elementary carousels in accordance with configured elementary carousel management policies.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
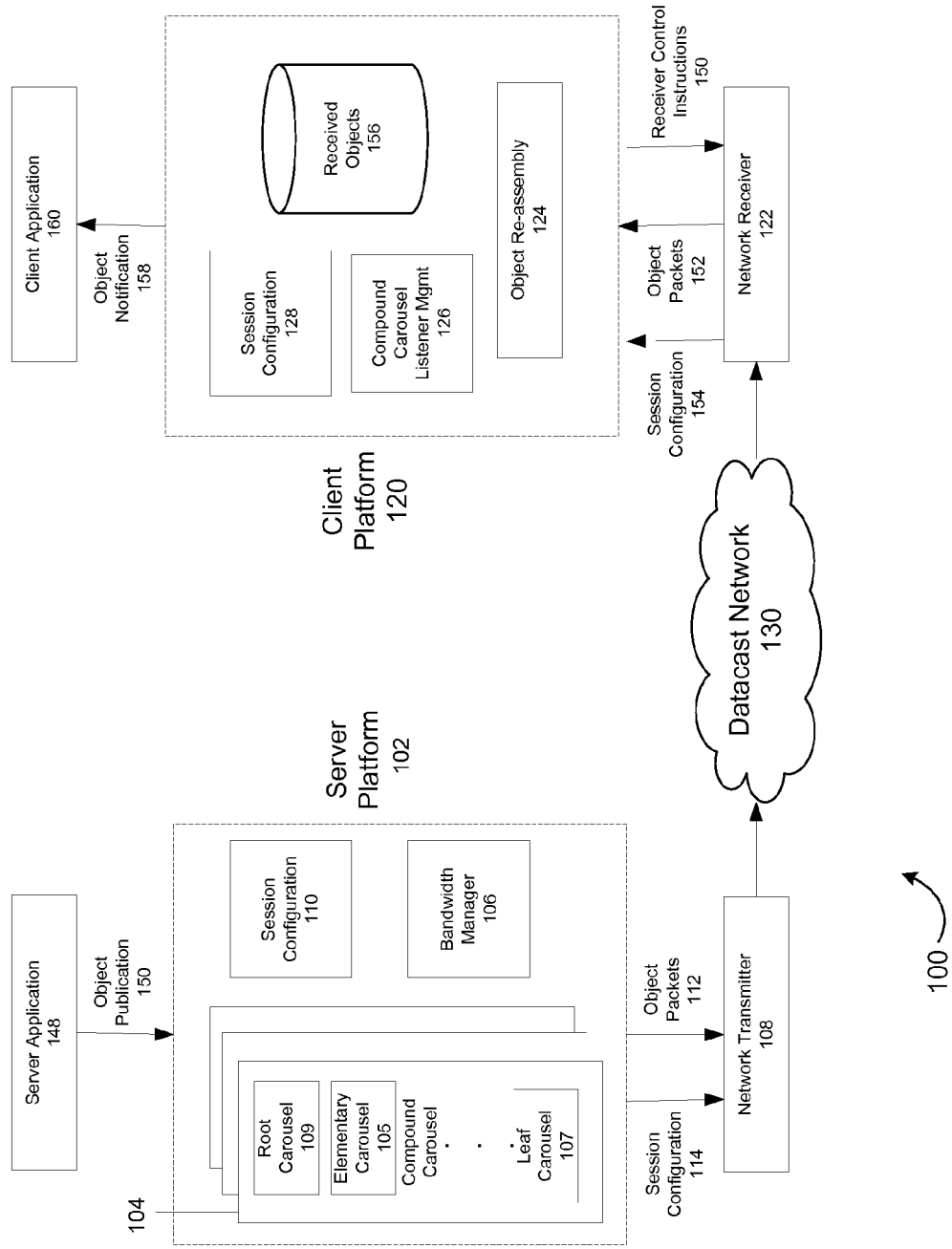
FIG. 1 is a functional block diagram illustrating aspects of a server platform and client platform that are part of an example datacast system suitable for implementing an embodiment of the present invention.

Embodiments of the present invention are directed to a datacast system, and associated apparatuses and methods for automatically managing a data object or objects within a hierarchical carousel structure by enabling, among other functions, the dynamic allocation of bandwidth to each carousel within the structure. The dynamic bandwidth allocation enables a server platform to redistribute the bandwidth allocated to a carousel or set of data objects to adjust to desired changes in object transmission policies or priorities of a datacast application. The hierarchical carousel structure appears to the datacast application as a single entity so that the application is not required to decide which objects to transmit from which carousels. In at least some embodiments of the invention, a client side method enables the client to automatically listen to different carousels depending at least in part on an operating state of the client device. In at least some embodiments of the invention, complexities of the hierarchical carousel structure may be at least partially hidden from the client device. For example, a facility may be provided enabling the client device to listen and/or subscribe to a single entity rather than to a particular carousel of the hierarchical carousel structure.

Some embodiments of the invention disclosed hereinafter are discussed in terms of utilizing a structure, that in accordance with some embodiments of the present invention, is termed a "compound carousel." In the context of the present invention, a compound carousel is a datacast management unit that automatically provides for the differentiated allocation of transmission resources (e.g., bandwidth) on a per-object basis. In at least one embodiment, for example, allocation of bandwidth to a data object is allowed to vary over time for the object. The bandwidth allocation may comprise one or more of the following processes, for example: a newly added object may be transmitted immediately, an object may be removed from the carousel or allocated less bandwidth after a certain time, and/or the total bandwidth used for transmission of an object may increase or decrease. There may be multiple compound carousels in use by one or more applications, sharing a common bandwidth resource. The present invention enables each compound carousel to be managed in such a way as to optimize the Delivery Quality of Service (DQoS) for a given total carousel bandwidth (i.e., the total bandwidth allocated to all carousels within the compound carousel), where this bandwidth may vary over time.

A benefit of some embodiments of the present invention is that the detailed management of various aspects of the data object transmission are not required to be managed by the datacast applications that are providing the data objects. On the server side, applications provide the overall DQoS strategy parameters to the compound carousel manager, and then publish the data objects. On the client side, applications are notified of the arrival of a new object, while the client component of the compound carousel infrastructure manages transmission reception in such a way as to optimize client power or battery usage and other relevant resources (e.g., client data processing resources).

Note that the concept of Delivery Quality of Service (DQoS) may encompass multiple aspects of object delivery as perceived by a datacast client. The listening pattern of a client should usually be taken into account in developing a datacast management strategy, since the objective is typically to minimize the overall bandwidth usage necessary to achieve the desired DQoS. DQoS is typically concerned with one or more aspects of object delivery and may include one or more of the following attributes (where the relative importance of each may be taken into account in developing the overall DQoS strategy): time taken to acquire a newly published object for a stable (currently listening) client, time taken to acquire all currently published objects for a joining (newly listening) client, or reliability of delivery for a given transmission error rate, for example.

Note that for a given available bandwidth, DQoS quality measures may need to be traded off against one another; the specific objectives will depend on the datacast application and session type, as described in more detail below. Although only exemplary, the following set of compound carousel application use cases is of interest and will be described in greater detail:

Rapid Update: Prioritized delivery of new additions to a file delivery carousel;

Rapid Update with Intermittent Listener: Prioritized delivery of new additions to a file delivery carousel for clients operating in an intermittent listening mode; and Outage Protection of Event Stream: A mechanism for recovery of missed one-time events.

Typically, management of a compound carousel server or server platform requires reacting to triggers for reallocation of resources in the system. These triggers may include, but are not limited to:

publication of a new object;

explicit removal of an object;

expiration of the coverage time of an object;

successful completion of reliable transmission of an object;

increase or decrease of the bandwidth available to the compound carousel; and/or changes in configuration parameters of the compound carousel.

Each of these events may trigger a change to the bandwidth currently allocated to an object, as well as to control information that is being provided with the data packets.

Operation and management of a compound carousel system client or client platform may involve monitoring the packet traffic not only for object data, but also for control information that allows optimized management of the client device resources. Typically, such control information may be parsed by the client and enable the client to take certain actions in an effort to better manage client resources. For example, the server may add control information to the packets that enables the client to determine that it has received all current objects. The client may then use such information to turn off its receiver to conserve battery power. The client could then wake up (turn on its receiver) periodically to see if there has been a change in the state of the carousel or objects within the carousel. Note that this means of saving battery power is only one exemplary use of control information. The client may also, for example, use control information to enable the client to ignore packets with certain headers thus saving processing, memory and battery resources. Likewise, a client may be able to receive a new object faster since more bandwidth is allocated to the rapid update carousel so that the receiver needs to be turned on for a shorter period of time and conserve battery if it has received all current objects. These and other types of operations or management services or functions are possible with cooperative client-server techniques in accordance with some embodiments of the present invention, as is described in more detail below. Note that certain aspects of the use of control information are described in the co-pending U.S. patent application Ser. No. 12/436,706 entitled "Datacasting System with Intermittent Listener Capability", filed May 6, 2009, the contents of which has been incorporated by reference in its entirety into this application.

FIG. 1 is a functional block diagram illustrating aspects of a server platform 102 and client platform 120 that are part of an example datacast system 100 suitable for implementing an embodiment of the present invention. Server platform 102 includes one or more compound carousels 104 that are populated with data objects provided by a server application 148. Each compound carousel 104 includes one or more elementary carousels 105, one of which may serve as a root carousel 109 and one of which may serve as a leaf carousel 107. Server platform 102 further includes a bandwidth manager 106 and a session configuration component 110. Server platform 102 provides session configuration data 114 and packetized object data (object data packets) 112 to a network transmitter component 108 which is used to transmit the session configuration data 114 and object packets 112 over a datacast network 130 to a network receiver component 122. Network receiver component 122 receives the transmitted data and provides session configuration data 154 (which typically is a subset of the session configuration 112 and represents that data in which the client application is interested) and object packets 152 to client platform 120. Note that some aspects of the operation of receiver component 122 may be determined by receiver control instructions 150 provided by client platform 120. Client platform 120 further includes an object (re)assembly component 124, a compound carousel listener management component 126, a session configuration component 128, and a data storage component 156 for storing the received data objects after re-assembly of the transmitted data packets into the respective data objects. Note that object packets and session configuration data may be transmitted from server platform 102 to one or more client platforms 120 over datacast network 130.

As shown in FIG. 1, in typical operation of an exemplary embodiment of the present invention, an object is published or otherwise provided 150 by a server application 148 to server platform 102 of the system 100. Session configuration component 110 may be implemented as a data storage for the session configuration parameters. The object to be datacast is added to one of the compound carousel 104 based on the DQoS (delivered quality of service) requirements and the session configuration parameters of the compound carousel(s). Bandwidth manager 106 is responsible for managing the bandwidth allocation and usage of each of compound carousels 104. When the bandwidth allocated to a compound carousel changes, the state of each elementary carousel 105 (which may be the root carousel 109 or leaf carousel 107) within that compound carousel is updated. The object(s) added to compound carousel 104 are packetized by elementary carousel 105 in preparation for transmission over datacast network 130 by network transmitter 108. As noted, the data object packets 112 are provided to network transmitter 108 for transmission over datacast network 130.

After transport over datacast network 130, the data object packets are received by network receiver 122, which is coupled to client platform 120, some aspects of the operation of which may be controlled by signals or instructions provided by the client side elements of system 100. As shown, network receiver 122 provides the received object packets 152 to client platform 120 of the system 100. Receiver control instructions 150 may be provided by compound carousel listener management component 126 based on the current state of the sessions and the session configuration parameters. Session configuration parameters 154 may be obtained through a suitable synchronization mechanism with server platform session configuration component 110 that occurs prior to, or during the datacast session. For this synchronization, a datacast mechanism (such as an Electronic Service Guide) or an out-of-band mechanism (such as HTTP fetch by the client of the session description) may be employed, although other suitable mechanisms are also possible. The received object packets 152 are then (re)assembled by object re-assembly component 124 into the data object or objects that were originally published by server application 148, and the client application 160 is notified of the availability of a new object by a suitable object notification mechanism 158. Note that the object may be part of the notification itself or may be stored in a data storage component for received objects 156 that client application 160 can access to retrieve the object. As discussed, compound carousel listener management component 126 controls certain aspects of the operation of network receiver 122 using receiver control instructions 150; this effectively allows the client platform to listen to the appropriate elementary carousel based on the methods described herein. In some embodiments, the operation of the listener management component is determined in whole or in part by the configuration data for a session, with that data being received as part of, or as a separate transmission from, the datacast.

In at least some embodiments of the present invention, there is assumed a multicast IP transport with undifferentiated packet delivery, and the modification of the per-object resource allocation consists of multicasting the packets of different objects at different rates. In at least some embodiments, this modification is implemented by maintaining a set of separate ALC (Asynchronous Layered Coding) protocol or FLUTE protocol (an enhancement of the ALC protocol) sessions of varying bandwidth, and moving objects from elementary carousel to elementary carousel within a compound carousel. For example, the ALC protocol may be one implemented in accordance with Luby et al., "Asynchronous Layered Coding (ALC) Protocol Instantiation," Internet Engineering Task Force (IETF) Request for Comments (RFC) 3450, December 2002, and the FLUTE protocol may be one implemented in accordance with Paila et al., "FLUTE—File Delivery over Unidirectional Transport," IETF RFC 3926, October 2004. Those of skill in the art will recognize that other techniques, methods, and protocols are possible and may be utilized to achieve a similar goal of per-object, time-varying delivery rate, and therefore can be utilized to implement embodiments of the present invention.

As noted, in the context of the present invention a "compound carousel" is a datacast management unit that provides differentiated allocation of transmission resources on a per-object basis. That is, once an object is added, it is transmitted one or more times with resources allocated to that object in a time-varying way, such that the overall optimization goals of the compound carousel and datacast system are met. Although the end effect may reduce in a special case to a simple "carousel" (i.e., repeated serial transmission of the objects currently managed), embodiments of the present invention allow the system to operate with a substantially different allocation of resources that can provide significantly improved Delivery Quality of Service (DQoS).

This allocation (in some implementations, the allocation of bandwidth used at a given instant to transmit packets corresponding to a data object) is allowed to vary over time, even for the same object. For example:

a newly added object may be transmitted immediately, with higher bandwidth allocated to it than existing objects;
  an object may be removed or allocated less bandwidth after a certain time; and/or
  the total bandwidth used for transmission of the objects may increase or decrease, provided that the overall DQoS target of the compound carousel is met.

The resource management of a compound carousel takes into account interactions with the overall bandwidth management methods and goals of the datacast system. There may be multiple compound carousels, together with other demands on the available bandwidth, so that the management policy of an individual compound carousel should be capable of dynamically adjusting to external conditions, and should be able to communicate to other elements of the system that the overall resources needed by the compound carousel may have changed.

Embodiments of the invention may be described in terms of a compound carousel that represents a managed collection of "elementary carousels" that have a well-defined behavior. In some embodiments, this behavior can be implemented by using techniques for managing simple carousels. Embodiments of the invention manage the bandwidth and object membership of these elementary carousels in a manner designed to optimize overall DQoS, subject to the bandwidth constraints of the compound carousel. It will be understood, however, that this management strategy can be applied in other implementations to allow time-varying resource allocation per object. For example, a single carousel can be allocated for each object, and the bandwidth allocated to each carousel can then be varied according to this management strategy.

In at least one embodiment, at least part of a compound carousel 104 may be constructed as a chain of elementary carousels, as shown in FIG. 1. In at least one implementation, each elementary carousel 105 may be implemented as a circular linked list with each list element pointing to an object to be transmitted. The head of the linked list may point to the object currently being transmitted. The objects in the elementary carousel may be transmitted in sequential order.

An example movement of objects within the compound carousel will now be described with reference to FIG. 1. The top level elementary carousel is referred to as the "root carousel" 109. The bottom level elementary carousel is referred as the "leaf carousel" 107. When a new object is added to a compound carousel 104, it is first added to its respective root carousel 109. When that object is to be removed from that elementary carousel, it is moved to the next elementary carousel in the chain. The object may be removed from the root carousel for a number of reasons including because it has been transmitted "reliably", and/or a lifetime of the object of the elementary carousel expires. When the object is removed from the second elementary carousel, it is moved to the third elementary carousel and so on through the chain. Eventually, the object will reach the leaf carousel 107 and when it is removed from that carousel, it has been completely removed from compound carousel 104.

Leaf elementary carousel 107 may optionally be marked as a "Base". When the leaf carousel is marked as a Base, whenever a file is added to compound carousel 104, it is added to both the Root and the Base (leaf) elementary carousels. For example, the file may be added to the Base carousel in the case that backward compatibility is desired with clients that are able to listen to a single carousel, but are not currently configured to make use of certain features of the present invention.

When a file is removed from a compound carousel, a remove operation (or its equivalent) is issued on the Root carousel and the file is removed from all elementary carousels including the base carousel of that compound carousel. As mentioned, typically, the file exists in the base carousel in the case that the file is added to the base carousel for backward compatibility. When a remove all operation (or its equivalent) is issued on the Root carousel, all objects are removed from all elementary carousels of the compound carousel.

Each time when an object is moved from one elementary carousel to another within a compound carousel, or is completely removed from the compound carousel, the bandwidth usage of each elementary carousel may be re-adjusted so that DQoS constraints on the datacast session can be met with the minimum bandwidth requirement. An update, including any unused bandwidth, is made available to the bandwidth manager 106 (FIG. 1) for re-distribution or re-allocation as needed.

One trigger or event that causes object movement within a compound carousel is when the object has been reliably transmitted within an elementary carousel. Note that there are multiple ways to determine that the object has been reliably transmitted, and any suitable method may be used in implementing the present invention.

The bandwidth manager 106, external to the set of compound carousels 104, assigns the bandwidth to be used for each compound carousel. Bandwidth allocation may be based on a number of factors. For example, allocation may be based on the configuration of a compound carousel. The configuration of a compound carousel takes into account a number of other factors such as: the overall bandwidth available, the acquisition time, and other QoS parameters such as error rate, transmission delays and the like. The bandwidth allocation may also be based on, for example, the dynamic bandwidth usage of each compound carousel. In this regard, a compound carousel may release some of its allocated bandwidth usage to the bandwidth manager depending on the actual bandwidth usage, or may request additional bandwidth if the allocated bandwidth was insufficient to satisfy a desired DQoS criteria. For example, if all the objects in the compound carousel have been transmitted, then no additional bandwidth is needed and the allocated, but unused bandwidth may be released back to the bandwidth manager. Note that these changes may result in reallocation of bandwidth (increase or decrease) to other sessions, where a session may correspond to a compound carousel, a simple file carousel, or another type of datacast session managed by the same bandwidth manager. Note that an elementary carousel typically does not support a session by itself, though it could, for example, in a situation in which the elementary carousel is not part of a compound carousel.

As described above, total datacasting bandwidth available to the server platform 102 may be limited, and may change over time. Compound carousels 104 and associated datacast sessions of different types (e.g., as maintained by the session configuration component 110) may place different demands on this common resource (i.e., the available bandwidth). The bandwidth manager 106 may manage allocation of the available bandwidth among the compound carousels 104 and/or the associated datacast sessions. In particular, the bandwidth manager 106 may dynamically allocate the available bandwidth among the compound carousels 104 and/or the associated datacast sessions as compound carousels 104 and/or associated datacast sessions are added, updated and/or deleted.

The bandwidth manager 106 may receive requests from the compound carousels 104 and/or send notifications to the compound carousels 104. The compound carousels 104 may receive requests from the bandwidth manager 106 and/or send notifications to the bandwidth manager 106. In particular, the compound carousels 104 may request desired bandwidth allocations from the bandwidth manager 106, and the bandwidth manager 106 may notify the compound carousels 104 of their actual bandwidth allocations. The bandwidth manager 106 may notify the compound carousels 104 of updated bandwidth allocations responsive to events other than requests. For example, the bandwidth manager 106 may issue updated bandwidth allocation notifications responsive to a change in the available bandwidth. As described above, each of the compound carousels 104 may incorporate one or more elementary carousels. Responsive to receiving a bandwidth allocation notification from the bandwidth manager 106, a compound carousel may further allocate and/or re-allocate the received bandwidth allocation among its elementary carousels, as is described below in more detail.

It will be helpful to describe examples of steps, processes, functions and/or operations that may be performed by the bandwidth manager 106 in accordance with some embodiments of the present invention. Procedures incorporating such steps, processes, functions and/or operations may be triggered and/or activated by suitable events including events internal and/or external to the compound carousels 104. Examples of suitable events include creation of a compound carousel, addition of a data object to a compound carousel, removal of a data object from a compound carousel, expiration of an elementary carousel lifetime, reconfiguration of a compound carousel and/or reconfiguration of the bandwidth manager 106.

Each datacast session may be associated with one or more compound carousels 104. However, typically datacast session and compound carousels 104 have a one to one correspondence, so that the terms "session" and "compound carousel" as used herein may be understood as referring to its corresponding associated concept and/or entity unless specifically stated otherwise or clearly contradicted by context. Similarly, each elementary carousel (e.g., elementary carousels 105, 107, 109 of FIG. 1) may facilitate datacasting of one or more data objects. However, in some embodiments of the present invention, elementary carousels may be utilized as a per-object bandwidth management mechanism within a compound carousel.

Each compound carousel 104 may include a set of suitable policies and/or rules ("policies") for managing its set of elementary carousels. Examples of suitable policies include policies with respect to addition, update and/or deletion of data objects, addition, update and/or deletion of elementary carousels, allocation of data objects to the elementary carousels, allocation of bandwidth to the elementary carousels including dynamic allocation and/or re-allocation ("dynamic allocation") of bandwidth to the elementary carousels, prioritization of elementary carousels (e.g., with respect to bandwidth), and/or suitable combinations thereof.

Each compound carousel 104 may further maintain a set of suitable quality of service (QoS) parameters (including QoS targets) applicable at the compound carousel level. For example, the compound carousel may apply its policies for managing its set of elementary carousels so as to achieve targets and/or enforce thresholds specified at least in part by the QoS parameters. Examples of suitable QoS parameters include a normal bandwidth guideline (e.g., an expected and/or typical bandwidth utilization), a maximum bandwidth guideline (may be a hard or soft limit), a minimum bandwidth guideline, a priority (e.g., corresponding to a session priority level), target acquisition time (AT) for new listeners (e.g., time to acquire a new copy of a particular data object), target acquisition time for update listeners (e.g., time to acquire one or more incremental updates to a previously acquired data object), target coverage time for outage victims, and one or more acquisition time relaxation factors (e.g., to accommodate variable loading by listeners).

In addition to parameters maintained by the compound carousels 104, the bandwidth manager 106 may maintain a set of suitable parameters for each of the compound carousels 104.

Examples of suitable parameters include a current bandwidth (e.g., a currently allocated portion of the available bandwidth and/or a measure current bandwidth utilization), and a prioritization status (e.g., a currently allocated priority level and/or an indication of whether the compound carousel has been preempted). The current bandwidth parameter maintained by the bandwidth manager 106 for each compound carousel 104 may be determined, for example, based at least on collective bandwidth allocation requests and/or collective session priority level allocations. The bandwidth manager 106 need not be aware and/or concerned with respect to details of how a particular compound carousel divides up its bandwidth allocation among its elementary carousels. However, the bandwidth manager 106 may query one or more of the compound carousels 104 for suitable information such as QoS targets and/or performance with respect to QoS targets.

Figure 2:
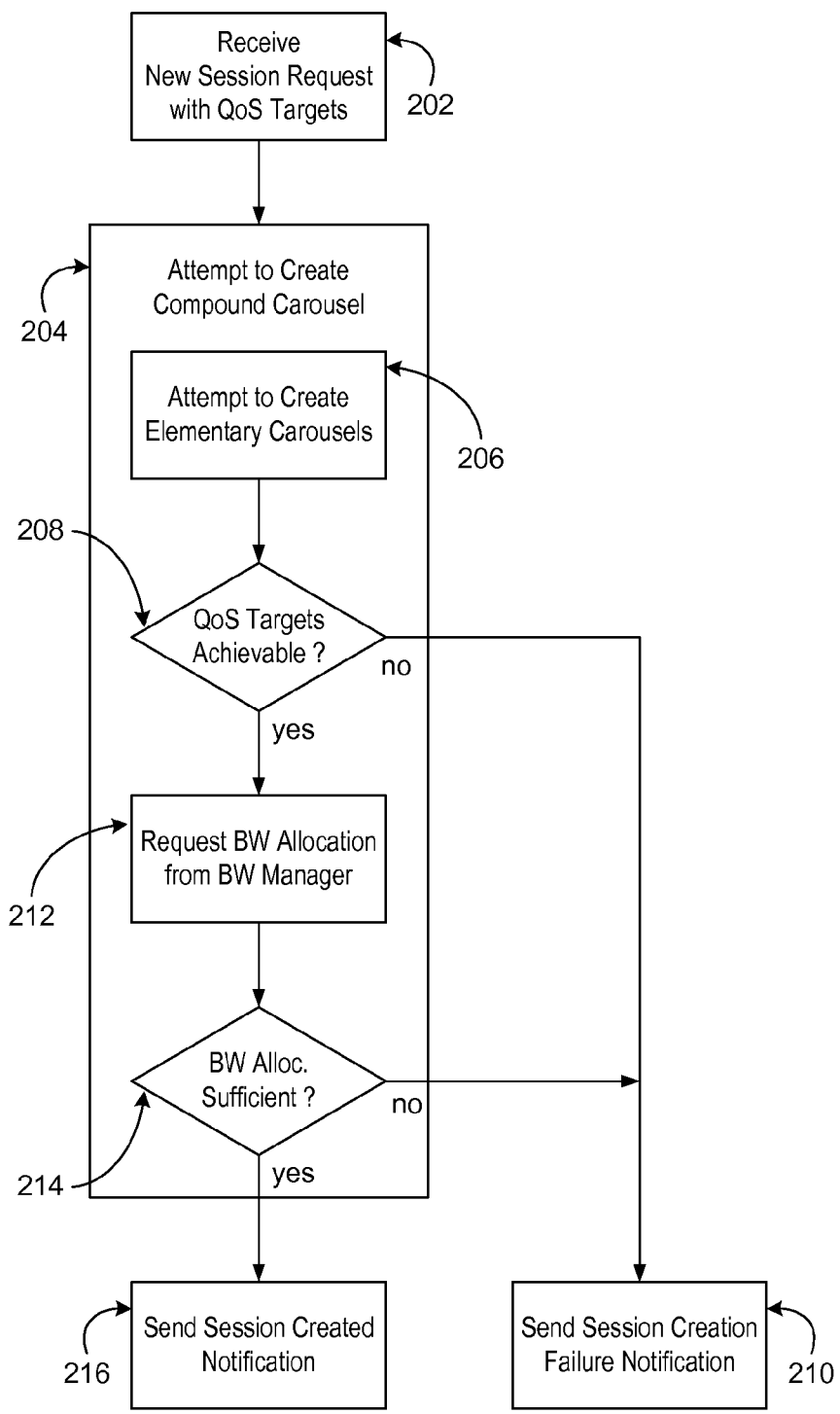
FIG. 2 is a flowchart depicting example steps for creating a compound carousel in accordance with some embodiments of the present invention.

FIG. 2 depicts example steps for creating a compound carousel in accordance with some embodiments of the present invention. At step 202, a new session request may be received. For example, the new session request may be received by the server platform 102 (FIG. 1) from an application such as the server application 148. The new session request may specify a session type and/or include a set of QoS parameters and/or targets such as those maintained by the compound carousels 104. The particular set of QoS parameters included in the new session request may be based at least on the session type. The new session request may further specify one or more load profiles including normal, expected and worst case load profiles. Parameters may be specified with any suitable parameter specification language including markup languages such as an extensible markup language (e.g., XML), programming languages including data structures thereof, languages defined expressly for the purpose, and suitable combinations thereof.

At step 204, an attempt to create a compound carousel may be initiated. For example, the server platform 102 (FIG. 1) may attempt to create a new one of the compound carousels 104 responsive to the request received at step 202. As depicted in FIG. 2, compound carousel creation may itself include multiple steps.

At step 206, an attempt to create one or more elementary carousels may be initiated. For example, the compound carousel under construction at step 204 may attempt to create its elementary carousels. The particular elementary carousels created may depend at least on the session type, for example, specified by the new session request. Corresponding QoS parameters provided to the elementary carousels may also depend at least on the session type, as described below in more detail.

At step 208, it may be determined whether the QoS targets are achievable. For example, the compound carousel under construction may determine whether the QoS targets are achievable based at least on resource requirement determinations made by the elementary carousel(s) referenced at step 206. As just one example, the compound carousel may determine a minimum bandwidth requirement for the compound carousel as a whole based at least on minimum bandwidth requirements determined by the elementary carousel(s) referenced at step 206. Again, such determinations are described in more detail below. If the QoS targets are not achievable, a procedure incorporating step 208 may progress to step 210. Otherwise, the procedure may progress to step 212.

At step 210, a notification of session creation failure may be sent. For example, the server platform 102 (FIG. 1) may send the notification of session creation failure to the server application 148 responsive to the request at step 202. Although not depicted in FIG. 2, the server application 148 may resubmit the request, for example, when additional resources are available, in the context of a different session type and/or with relaxed QoS targets. The quality of service provided by a compound carousel may be constrained in complex ways. Such notifications of session creation failure may contribute to an awareness that such constraints are being reached and/or an understanding of how the quality of service is being constrained.

As part of elementary carousel creation, the compound carousel may determine a desired bandwidth allocation for the compound carousel as a whole. At step 212, a bandwidth (BW) allocation request may be sent. For example, the compound carousel under construction may send the bandwidth allocation request to the bandwidth manager 106 (FIG. 1). As described below in more detail (although not shown in FIG. 2), the bandwidth manager 106 may determine a bandwidth allocation for the compound carousel in a context of the compound carousels 104, and respond to the request at step 212. At step 214, it may be determined if the allocated bandwidth is sufficient. For example, the compound carousel under construction may compare the bandwidth allocated by the bandwidth manager 106 with the bandwidth allocation requested at step 212. If the allocated bandwidth is insufficient, the procedure may progress to step 210. Otherwise, the procedure may progress to step 216.

Step 214 may be performed by the bandwidth manager 106 (FIG. 1). For example, the bandwidth manager 106 may determine whether the bandwidth allocation request by the compound carousel under construction can be accommodated based at least on the total available bandwidth and/or a bandwidth allocated to a particular set of multiplexed datacast sessions that is to include the new datacast session requested at step 202. However, it may be that the compound carousel under construction has the flexibility to adapt to a bandwidth allocation that is less than that requested. In such a case, step 214 may be performed by the compound carousel. At step 216, a session created notification may be sent. For example, the server platform 102 may send the session created notification to the server application 148 responsive to the request at step 202.

Figure 3:
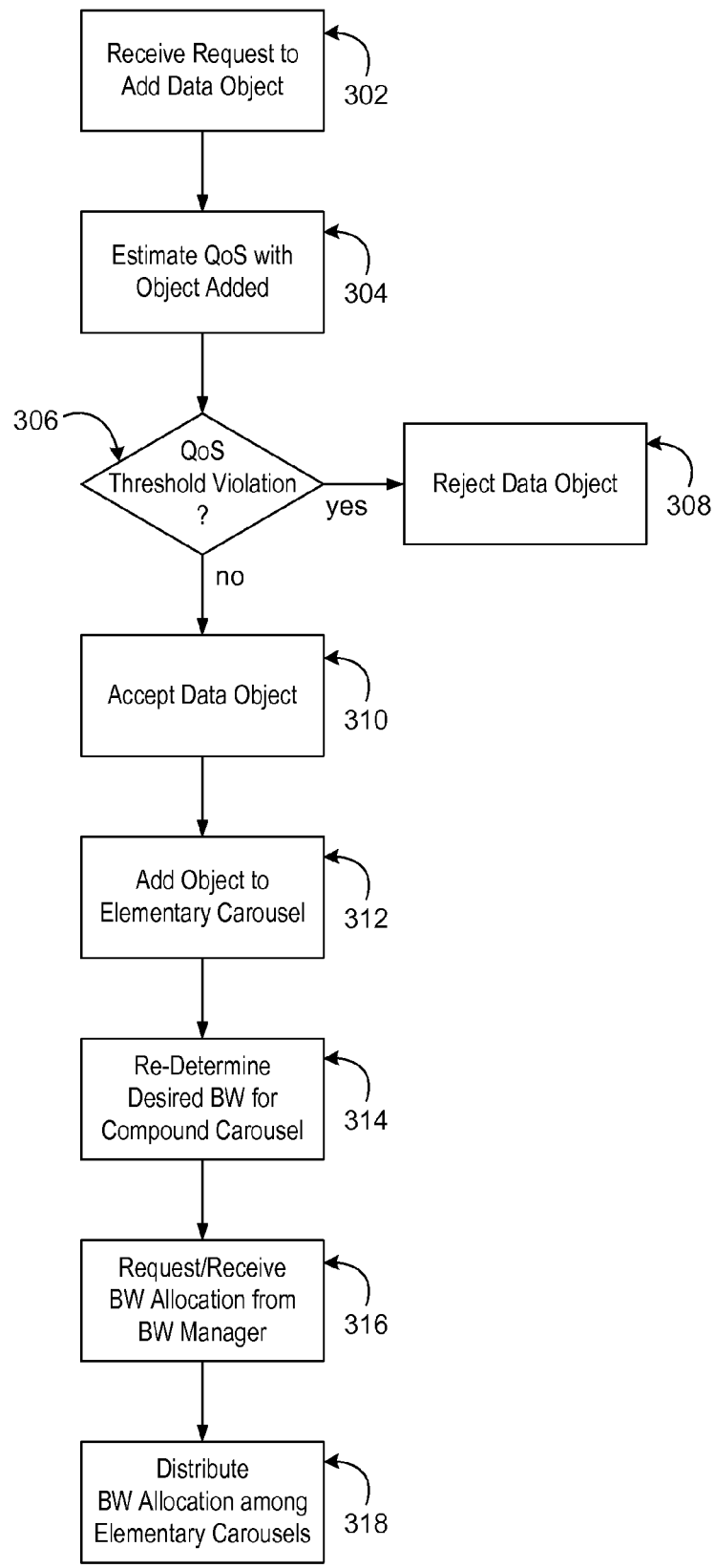
FIG. 3 is a flowchart depicting example steps for adding a data object to a compound carousel in accordance with some embodiments of the present invention.

FIG. 3 depicts example steps for adding a data object to a compound carousel in accordance with some embodiments of the present invention. At step 302, a request to add a data object may be received. For example, the server platform 102 (FIG. 1) may receive a request to add the data object to a particular datacast session associated with a particular compound carousel. At step 304, hypothetical values for one or more QoS parameters may be estimated. For example, the compound carousel may estimate changes to current QoS parameter values that would occur if the data object of step 302 were added to the compound carousel.

At step 306, it may be determined whether the hypothetical values estimated at step 304 would violate any QoS thresholds. For example, the compound carousel may compare the estimated values (e.g., new object acquisition time) with corresponding QoS thresholds (e.g., minimum new object acquisition time). If the estimated values do violate one or more QoS thresholds, a procedure incorporating step 306 may progress to step 308. Otherwise, the procedure may progress to step 310. At step 308, the data object may be rejected. For example, the server platform 102 (FIG. 1) may send a reject add data object request notification responsive to the request of step 302. At step 310, the data object may be accepted. For example, the server platform 102 may send an accept add data object request notification responsive to the request of step 302.

At step 312, the data object may be added to one or more elementary carousels. For example, the compound carousel may add the data object to a rapid update elementary carousel and/or a previously empty elementary carousel (thus activating the). The compound carousel may create a new elementary carousel for the new data object. At step 314, a desired bandwidth for the compound carousel may be (re-)determined. For example, as described below in more detail, the compound carousel may re-determine the desired bandwidth base at least on estimated acquisition time determinations made by its elementary carousels. With the data object added, the re-determined desired bandwidth for the compound carousel may be greater than a previously determined desired bandwidth, however, this is not necessarily the case.

At step 316, the compound carousel may request the desired bandwidth from the bandwidth manager 106 (FIG. 1), and receive a corresponding bandwidth allocation in response. In addition, the request may cause the issuance of bandwidth allocation notifications to carousels other than the requesting carousel. For example, if the data object is added to a compound carousel associated with a datacast session having a high priority level, other carousels may have their bandwidth allocations reduced to accommodate the new data object. At step 318, the bandwidth allocation received at step 316 may be distributed among the elementary carousels of the compound carousels in accordance with the set of elementary carousel management policies.

Figure 4:
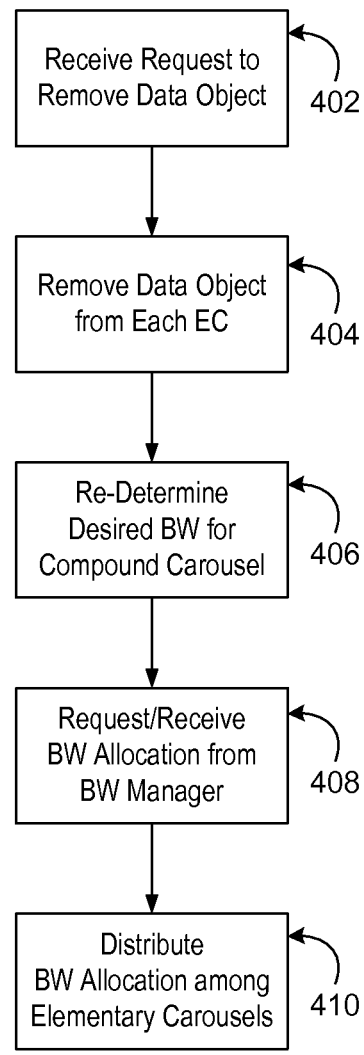
FIG. 4 is a flowchart depicting example steps for removing a data object from a compound carousel in accordance with some embodiments of the present invention.

FIG. 4 depict example steps for removing a data object from a compound carousel in accordance with some embodiments of the present invention. At step 402, a request to remove the data object may be received. For example, the server platform 102 (FIG. 1) may receive the request to remove from the server application 148. Alternatively, the compound carousel may receive the request directly. At step 404, the data object may be removed from each elementary carousel to which it was added. For example, the server platform 102 may identify one or more of the compound carousels associated with the data object and instruct the compound carousel(s) to remove the data object. The identified compound carousel(s) may each identify one or more of their elementary carousels datacasting the data object, and remove the data object from the identified elementary carousels. Removing the data object from an elementary carousel may delete and/or deactivate the elementary carousel.

With the data object removed, the desired bandwidth of the compound carousel may decrease, however, this is not necessarily the case, and at step 406, the desired bandwidth for the compound carousel may be re-determined. For example, step 406 may correspond to and/or be implemented in accordance with step 314 of FIG. 3. Similarly, steps 408 and 410 (request/receive a new bandwidth allocation and distribute it among the elementary carousels) may correspond to and/or be implemented in accordance with steps 316 and 318. For example, removal of the data object may allow compound carousels associated with lower priority datacast sessions to be upgraded to normal operation (e.g., utilizing datacasting bandwidth in accordance with a normal bandwidth guideline in contrast with a minimum bandwidth guideline).

Figure 5:
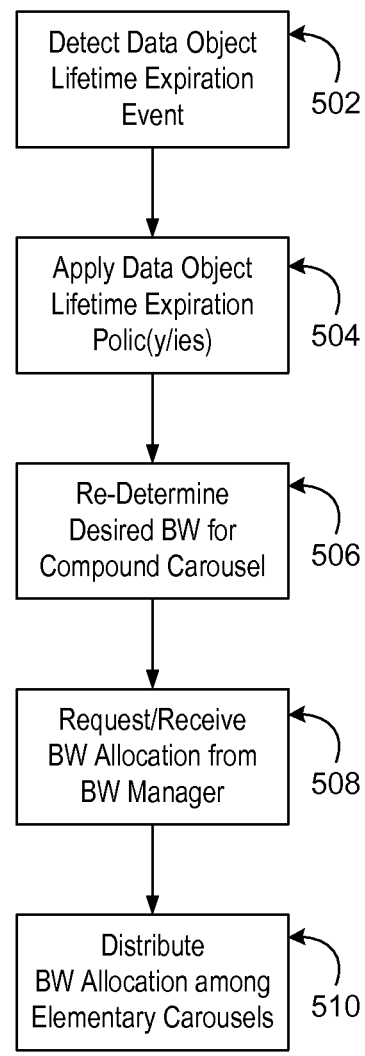
FIG. 5 is a flowchart depicting example steps for handling a lifetime expiration event in accordance with some embodiments of the present invention.

Data objects may have one or more associated lifetimes. For example, a lifetime to be datacast at a particular priority, a lifetime to be datacast at any priority, a lifetime associated with a particular elementary carousel, and/or suitable combinations thereof. A lifetime may be specified as a particular time period and/or as a particular date and/or time ("time") in the future with respect to data object creation, time of addition to an elementary carousel, and/or any suitable reference time. FIG. 5 depicts example steps for handling a lifetime expiration event in accordance with some embodiments of the present invention.

At step 502, a data object lifetime expiration event may be detected. For example, An elementary carousel datacasting the data object may notify an associated compound carousel of the lifetime expiration event. At step 504, one or more data object lifetime expiration policies may be applied. For example, the notified compound carousel may apply the one or more data object lifetime expiration policies in accordance with its set of elementary carousel management policies. Suitable such policies may include moving the data object from the elementary carousel to one or more alternative (e.g., lower priority) elementary carousels, and/or deleting and/or deactivating the elementary carousel. A procedure incorporating step 504 may then progress to the now familiar set of steps 506, 508, 510, for example, corresponding to the steps 406, 408 and 410, respectively, of FIG. 4.

In fact, by replacing step 502 with detection of a compound carousel reconfiguration event, the steps of FIG. 5 may be applied to any suitable compound carousel reconfiguration event including reconfiguration of an associated datacast session and/or a QoS parameter thereof, and receipt of a bandwidth (re)allocation notification.

It will be helpful to describe details for determining elementary carousel QoS parameter values for various datacast session types in accordance with some embodiments of the present invention. For example, as described above, the server application 148 (FIG. 1) may attempt to establish a datacast session having a particular type and/or QoS parameter values. The datacast session may be associated with and/or implemented by a compound carousel. The compound carousel may configure its elementary carousel(s) in accordance with the datacast session type and/or the QoS parameter values. In accordance with some embodiments of the present invention, the server application 148 need not configure any elementary carousels directly.

For example, the server application 148 may specify a datacast session of a particular type and with parameters such as load parameters and QoS parameters including a normal bandwidth guideline, a maximum bandwidth guideline, a minimum bandwidth guideline and a priority level. Each compound carousel associated with the datacast session may be configured with the datacast session QoS parameters. For example, the priority level of the datacast session becomes the priority level of the compound carousel (the CC priority level), and so forth. The specified QoS parameters may vary by datacast session type. For clarity, the following examples assume that a single compound carousel is associated with the datacast session, however, as described above, each embodiment of the invention is not so limited.

The datacast session type may be a simple datacast session. The compound carousel associated with the simple datacast session may include a single elementary carousel. The simple datacast session may have a maximum data size load parameter, for example, indicating a maximum size of a data object that may be placed on the associated compound carousel. The compound carousel may determine one or more QoS parameters for its single elementary carousel based at least on the load parameters and/or the QoS parameters of the simple datacast sessions. For example, the compound carousel may set normal, maximum and minimum bandwidth guidelines for the elementary carousel equal to the corresponding bandwidth guidelines for the compound carousel. Furthermore, the compound carousel may set a target acquisition time for the elementary carousel equal to the maximum data size load parameter value divided by the normal bandwidth guideline value.

The datacast session type may be a "file with rapid update" type (i.e., a rapid update datacast session). The compound carousel associated with the rapid update datacast session may include a base elementary carousel and an update elementary carousel. The rapid update datacast session may have load parameters including a base maximum data size, an update average data size and an update interval. The QoS parameters for the rapid update datacast session may include an update acquisition time factor relating acquisition times for the base and update elementary carousels. The compound carousel may determine an acquisition time for the base elementary carousel (base EC acquisition time) based at least on the normal bandwidth guideline for the compound carousel, the base maximum data size, the update average data size, the update interval and/or the update acquisition time factor. For example, the compound carousel may solve for the base EC acquisition time with the assumption of a worst case load (e.g., all base ECs and update ECs loaded with base maximum data size and update average data size, respectively). The compound carousel may determine an acquisition time for the update elementary carousel (update EC acquisition time) by applying the update acquisition time factor to the base EC acquisition time. For example, the update EC acquisition time may be equal to the base EC acquisition time multiplied by the update acquisition time factor.

The compound carousel may determine normal bandwidth guidelines for its base and update elementary carousels, for example, based at least on determined acquisition times and a worst case load assumption. The compound carousel may determine minimum bandwidth guidelines for its base and update elementary carousels. For example, the minimum bandwidth guidelines may be set in proportion to corresponding normal bandwidth guidelines and such that the sum of the minimum bandwidth guidelines for the elementary carousels is less than or equal to the minimum bandwidth guideline for the compound carousel. As another example, the base elementary carousel minimum bandwidth guideline may be set equal to the minimum bandwidth guideline for the compound carousel and the minimum bandwidth guideline for the update elementary carousel may be set to zero. The compound carousel may determine maximum bandwidth guidelines for its base and update elementary carousels. For example, the maximum bandwidth guidelines may be set in proportion to corresponding normal bandwidth guidelines and such that the sum of the maximum bandwidth guidelines for the elementary carousels is less than or equal to the maximum bandwidth guideline for the compound carousel. As another example, the base elementary carousel maximum bandwidth guideline may be set equal to the normal bandwidth guideline for the base elementary carousel and the maximum bandwidth guideline for the update elementary carousel may be set to a remaining portion of available bandwidth such as a difference between the maximum bandwidth guideline for the compound carousel and the maximum bandwidth guideline for the base elementary carousel.

The datacast session type may be a "event with outage victim" type (i.e., an outage victim datacast session). The compound carousel associated with the outage victim datacast session may include an event elementary carousel and an outage elementary carousel. The outage victim datacast session may have load parameters including an event average data size and an event interval. The QoS parameters for the outage victim datacast session may include an outage coverage time period and an outage acquisition time factor relating acquisition times for the event and outage elementary carousels. The compound carousel may determine an acquisition time for the event elementary carousel (event EC acquisition time) based at least on the normal bandwidth guideline for the compound carousel, the event average data size, the event interval and/or the outage acquisition time factor. For example, the compound carousel may solve for the event EC acquisition time with the assumption of a worst case load (e.g., all event ECs and outage ECs loaded with event average data size throughout the outage coverage time). The compound carousel may determine an acquisition time for the outage elementary carousel (outage EC acquisition time) by applying the outage acquisition time factor to the event EC acquisition time. For example, the outage EC acquisition time may be equal to the event EC acquisition time divided by the outage acquisition time factor.

The compound carousel may determine normal bandwidth guidelines for its event and outage elementary carousels, for example, based at least on determined acquisition times and a worst case load assumption. The compound carousel may determine minimum bandwidth guidelines for its event and outage elementary carousels. For example, the minimum bandwidth guidelines may be set in proportion to corresponding normal bandwidth guidelines and such that the sum of the minimum bandwidth guidelines for the elementary carousels is less than or equal to the minimum bandwidth guideline for the compound carousel. As another example, the event elementary carousel minimum bandwidth guideline may be set equal to the minimum bandwidth guideline for the compound carousel and the minimum bandwidth guideline for the outage elementary carousel may be set to zero. The compound carousel may determine maximum bandwidth guidelines for its event and outage elementary carousels. For example, the maximum bandwidth guidelines may be set in proportion to corresponding normal bandwidth guidelines and such that the sum of the maximum bandwidth guidelines for the elementary carousels is less than or equal to the maximum bandwidth guideline for the compound carousel. As another example, the event elementary carousel maximum bandwidth guideline may be set equal to the normal bandwidth guideline for the event elementary carousel and the maximum bandwidth guideline for the outage elementary carousel may be set to a remaining portion of available bandwidth such as a difference between the maximum bandwidth guideline for the compound carousel and the maximum bandwidth guideline for the base elementary carousel.

Hybrid and/or combination datacast session types are possible. For example, the datacast session type may be a "file with rapid update and outage victim" type. The compound carousel associated with the hybrid datacast session may include a base elementary carousel, an update elementary carousel and an outage elementary carousel. The hybrid datacast session may have load parameters including a base maximum data size, an update average data size and an update interval. The QoS parameters for the hybrid datacast session may include an update acquisition time factor relating acquisition times for the base and update elementary carousels, an outage coverage time period, and an outage acquisition time factor relating acquisition times for the base and outage elementary carousels. The compound carousel may determine an acquisition time for the base elementary carousel (base EC acquisition time) based at least on the normal bandwidth guideline for the compound carousel, the base maximum data size, the update average data size, the update interval, the update acquisition time factor, the outage coverage time period and/or the outage acquisition time factor. For example, the compound carousel may solve for the base EC acquisition time with the assumption of a worst case load (e.g., all base ECs, update ECs and outage ECs loaded with base maximum data size, update average data size and update average data size, respectively, throughout the outage coverage time period). The compound carousel may determine an acquisition time for the update elementary carousel (update EC acquisition time) by applying the update acquisition time factor to the base EC acquisition time.

For example, the update EC acquisition time may be equal to the base EC acquisition time multiplied by the update acquisition time factor. The compound carousel may determine an acquisition time for the outage elementary carousel (outage EC acquisition time) by applying the outage acquisition time factor to the base EC acquisition time. For example, the outage EC acquisition time may be equal to the base EC acquisition time multiplied by the outage acquisition time factor.

The compound carousel may determine normal bandwidth guidelines for its base, update and outage elementary carousels, for example, based at least on determined acquisition times and a worst case load assumption. The compound carousel may determine minimum bandwidth guidelines for its base, update and outage elementary carousels. For example, the minimum bandwidth guidelines may be set in proportion to corresponding normal bandwidth guidelines and such that the sum of the minimum bandwidth guidelines for the elementary carousels is less than or equal to the minimum bandwidth guideline for the compound carousel. As another example, the base elementary carousel minimum bandwidth guideline may be set equal to the minimum bandwidth guideline for the compound carousel and the minimum bandwidth guidelines for the update and outage elementary carousels may be set to zero. The compound carousel may determine maximum bandwidth guidelines for its base, update and outage elementary carousels. For example, the maximum bandwidth guidelines may be set in proportion to corresponding normal bandwidth guidelines and such that the sum of the maximum bandwidth guidelines for the elementary carousels is less than or equal to the maximum bandwidth guideline for the compound carousel. As another example, the base elementary carousel maximum bandwidth guideline may be set equal to the normal bandwidth guideline for the base elementary carousel, the outage elementary carousel maximum bandwidth guideline may be set equal to the normal bandwidth guideline for the outage elementary carousel, and the maximum bandwidth guideline for the update elementary carousel may be set to a remaining portion of available bandwidth such as a difference between the maximum bandwidth guideline for the compound carousel and the sum of the base and outage elementary carousel maximum bandwidth guidelines.

As another example of a hybrid datacast session type, the datacast session type may be a "file with rapid update and intermittent listener" type. The compound carousel associated with this hybrid datacast session may include a base elementary carousel and an update elementary carousel. The hybrid datacast session may have load parameters including a base maximum data size, an update average data size and an update interval. The QoS parameters for the hybrid datacast session may include an intermittent listener time period and an update acquisition time factor relating acquisition times for the base and update elementary carousels. The compound carousel may determine an acquisition time for the base elementary carousel (base EC acquisition time) based at least on the normal bandwidth guideline for the compound carousel, the base maximum data size, the update average data size, the update interval, the intermittent listener time period and/or the update acquisition time factor. For example, the compound carousel may solve for the base EC acquisition time with the assumption of a worst case load (e.g., all base ECs and update ECs loaded with base maximum data size and update average data size, respectively). The compound carousel may determine an acquisition time for the update elementary carousel (update EC acquisition time) by applying the update acquisition time factor to the base EC acquisition time. For example, the update EC acquisition time may be equal to the base EC acquisition time multiplied by the update acquisition time factor.

The compound carousel may determine normal bandwidth guidelines for its base and update elementary carousels, for example, based at least on determined acquisition times and a worst case load assumption. The compound carousel may determine minimum bandwidth guidelines for its base and update elementary carousels. For example, the minimum bandwidth guidelines may be set in proportion to corresponding normal bandwidth guidelines and such that the sum of the minimum bandwidth guidelines for the elementary carousels is less than or equal to the minimum bandwidth guideline for the compound carousel. As another example, the base elementary carousel minimum bandwidth guideline may be set equal to the minimum bandwidth guideline for the compound carousel and the minimum bandwidth guideline for the update elementary carousel may be set to zero. The compound carousel may determine maximum bandwidth guidelines for its base and update elementary carousels. For example, the maximum bandwidth guidelines may be set in proportion to corresponding normal bandwidth guidelines and such that the sum of the maximum bandwidth guidelines for the elementary carousels is less than or equal to the maximum bandwidth guideline for the compound carousel. As another example, the base elementary carousel maximum bandwidth guideline may be set equal to the normal bandwidth guideline for the base elementary carousel and the maximum bandwidth guideline for the update elementary carousel may be set to a remaining portion of available bandwidth such as a difference between the maximum bandwidth guideline for the compound carousel and the maximum bandwidth guideline for the base elementary carousel.

Figure 6:
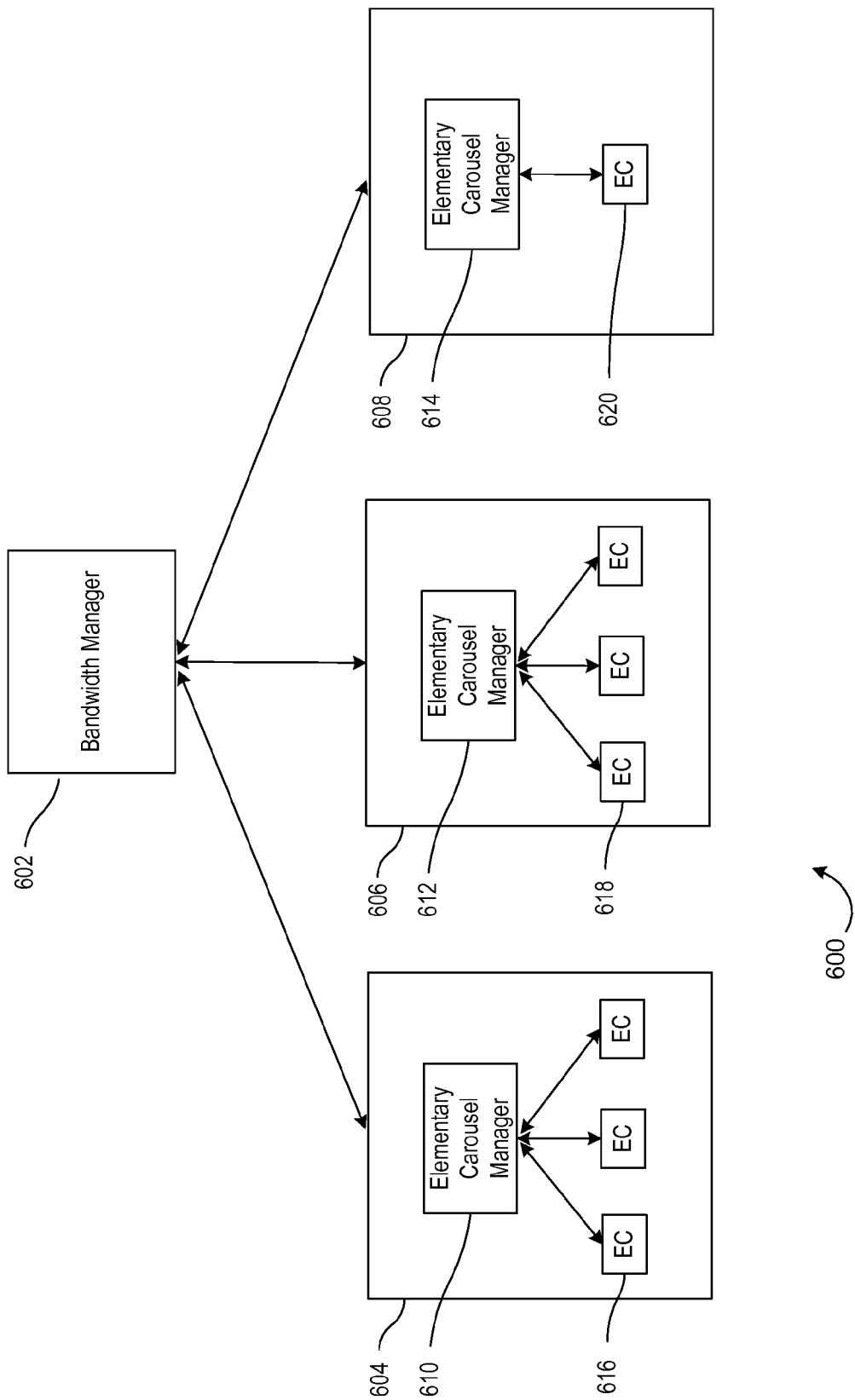
FIG. 6 is a schematic diagram depicting aspects of an example delivery quality of service (DQoS) management hierarchy in accordance with some embodiments of the present invention.

Having described aspects of compound carousels in accordance with some embodiments of the present invention and their relationships with datacasting sessions of various types, it will be helpful to describe further details of bandwidth managers in accordance with some embodiments of the present invention and their relationships with compound carousels. In accordance with some embodiments of the present invention, DQoS management capability may be facilitated in the datacast system 100 (FIG. 1) by a hierarchy including the bandwidth manager 106, the compound carousels 106 and a plurality of elementary carousels such as the elementary carousel 105. FIG. 6 depicts aspects of an example DQoS management hierarchy 600 in accordance with some embodiments of the present invention.

The DQoS management hierarchy 600 may include a bandwidth manager 602 managing one or more compound carousels 604, 606, 608. The bandwidth manager 602 may be an example of and/or implemented at least in part by the bandwidth manager 106 of FIG. 1. Similarly, the compound carousels 604, 606, 608 may be examples of and/or implemented at least in part by the compound carousels 104 of FIG. 1. Each compound carousel 604, 606, 608 may include an elementary carousel manger 610, 612, 614 managing one or more elementary carousels (EC) 616, 618, 620. The elementary carousels may be examples of and/or implemented at least in part by elementary carousels described with reference to FIG. 1 such as the elementary carousel 105. The arrows in FIG. 6 between the bandwidth manager 602 and the compound carousels 604, 606, 608 indicate a bidirectional communicative path between the modules 602, 604, 606, 608. As will be apparent to one of skill in the art, such a communicative path may employ messages including messages of a protocol, calls such as programmatic calls, remote procedure calls, and/or any suitable communicative technique. The arrows between the elementary carousel managers 610, 612, 614 and the elementary carousels 616, 618, 620 indicate a like communicative path.

Figure 7:
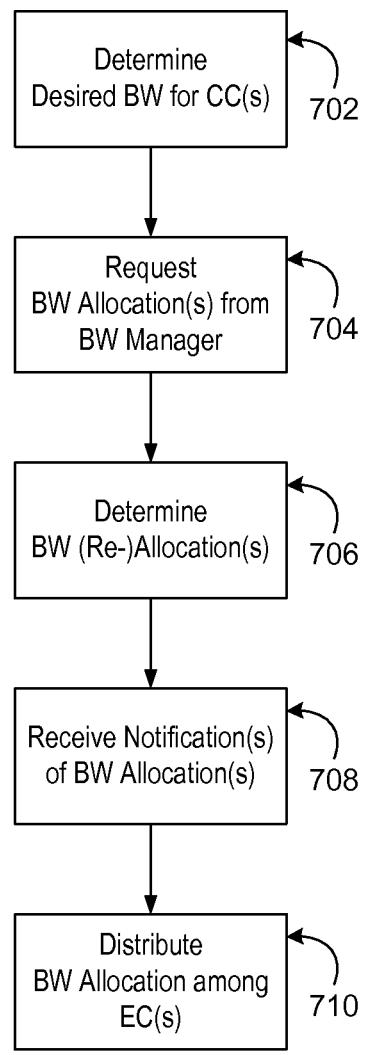
FIG. 7 is a flowchart depicting example steps for managing DQoS in accordance with some embodiments of the present invention.

FIG. 7 depicts example steps that may be performed by the DQoS management hierarchy 600 (FIG. 6) in accordance with some embodiments of the present invention. For example, a procedure incorporating these steps may be triggered by events as described above with reference to FIG. 2, FIG. 3, FIG. 4 and/or FIG. 5. Although such an event may be initiated, for example, by the server application 148 (FIG. 1), the steps depicted in FIG. 7 may be performed, for example, by the server platform 102, independent of further interaction with the server application 148. At step 702, a desired bandwidth may be determined for each compound carousel 604, 606, 608. For example, the desired bandwidth for each compound carousel 604, 606, 608 may be determined at least in part by querying the respective elementary carousels 616, 618, 620 for corresponding desired bandwidths. Example steps that may be performed by the compound carousel 604, 606, 608 and the elementary carousels 616, 618, 620 to determine the desired bandwidth are described below in more detail.

At step 704, the compound carousel 604, 606, 608 (FIG. 6) may request a bandwidth allocation from the bandwidth manager 602. For example, one or more of the compound carousels 604, 606, 608 may utilize the communicative path to request the desired bandwidth(s) determined at step 702 from the bandwidth manager 602. At step 706, the bandwidth manager 602 may determine bandwidth (re-)allocations for each of the compound carousels 604, 606, 608. A request from one of the compound carousels 604, 606, 608 at step 704 may results in a new bandwidth allocation for each of the compound carousels 604, 606, 608. Example steps for determining bandwidth (re-)allocations in accordance with some embodiments of the present invention are described below in more detail.

At step 708, the compound carousel 604, 606, 608 (FIG. 6) may receive a bandwidth (re-)allocation notification from the bandwidth manager 602. For example, the bandwidth manager 602 may send bandwidth (re-)allocation notifications to the compound carousel 604, 606, 608 utilizing the communicative path and responsive to the bandwidth (re-)allocations of step 706. At step 710, each compound carousel 604, 606, 608 may distribute its bandwidth allocation among its respective elementary carousels 616, 618, 620, for example, as described below in more detail.

Figure 8:
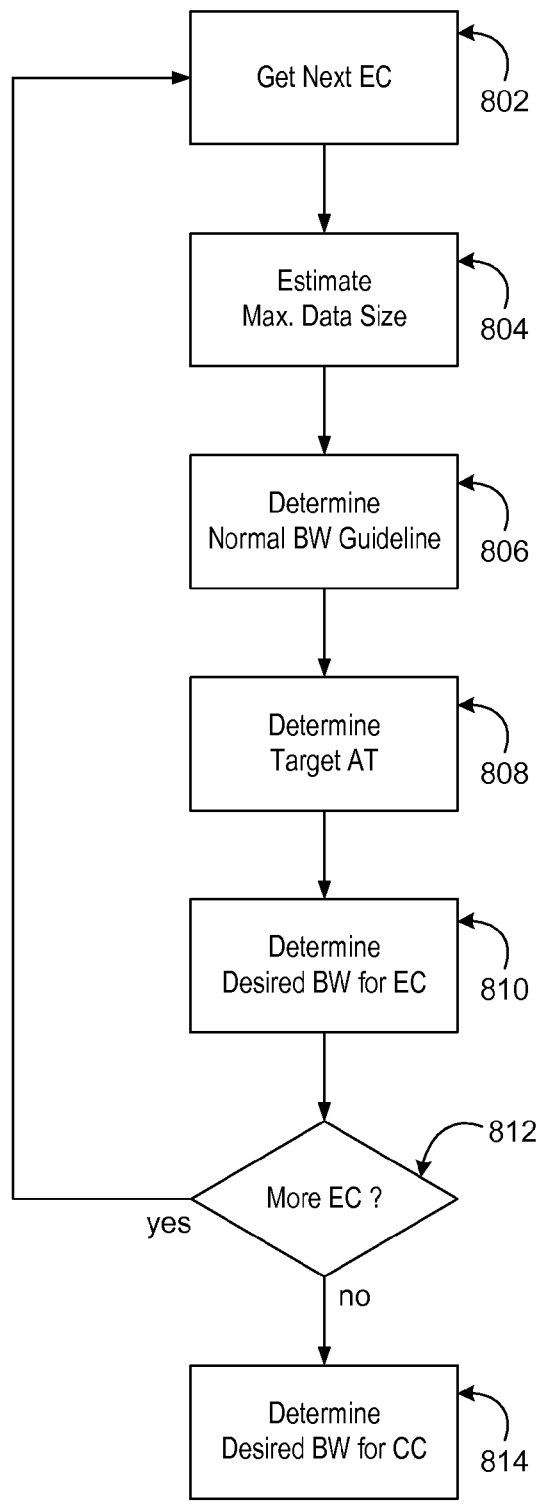
FIG. 8 is a flowchart depicting further example steps for managing DQoS in accordance with some embodiments of the present invention.

FIG. 8 depicts example steps that may be performed by compound carousels 604, 606, 608 (FIG. 6) to determine a desired bandwidth. At step 802, a next one of the elementary carousels 616, 618, 620 of the compound carousel 604, 606, 608 may be selected. At step 804, a maximum data size for the selected elementary carousel may be estimated. For example, the maximum data size may be estimated by the managing elementary carousel manager based at least on part on load parameters of the datacast session associated with the corresponding compound carousel. The load parameters may include a maximum data size (e.g., base maximum data size for a base elementary carousel) and/or periodic load parameters (e.g., average update data size and update interval) that may be utilized to estimate a suitable data size (e.g., a product of average update data size and update interval).

At step 806, a normal bandwidth guideline may be determined for the selected elementary carousel. For example, the managing elementary carousel manager may determine the normal bandwidth guideline for the selected elementary carousel based at least in part on the associated datacast session as described above. At step 808, a target acquisition time may be determined for the selected elementary carousel. For example, the managing elementary carousel manager may determine the target acquisition time based at least on the maximum data size estimated at step 804 and/or the normal bandwidth guideline determined at step 806. In accordance with some embodiments of the present invention, the target acquisition time may be determined as the estimated maximum data size divided by the determined normal bandwidth guideline.

At step 810, a desired bandwidth may be determined for the selected elementary carousel. For example, the managing elementary carousel manager may determine the desired bandwidth based at least on a current total size of data loaded on the selected elementary carousel, the target acquisition time as determined at step 808, and/or an overhead factor. In accordance with some embodiments of the present invention, the desired bandwidth may be determined as the current total data size divided by the target acquisition time and multiplied by the overhead factor. The overhead factor may account for overhead incurred by the selected elementary carousel and/or an associated datacasting protocol such as the FLUTE protocol.

At step 812, it may be determined if the managing elementary carousel manager manages any more elementary carousels. If there are elementary carousels for which a desired bandwidth has not yet been determined, a procedure incorporating step 812 may return to step 802. Otherwise, the procedure may progress to step 814 where a desired bandwidth may be determined for the compound carousel as a whole. For example, the compound carousel may determine its desired bandwidth based at least in part on the desired bandwidths of its elementary carousels. In accordance with some embodiments of the present invention, the compound carousel may determine its desired bandwidth at least in part by summing the desired bandwidths of its elementary carousels.

Figure 9:
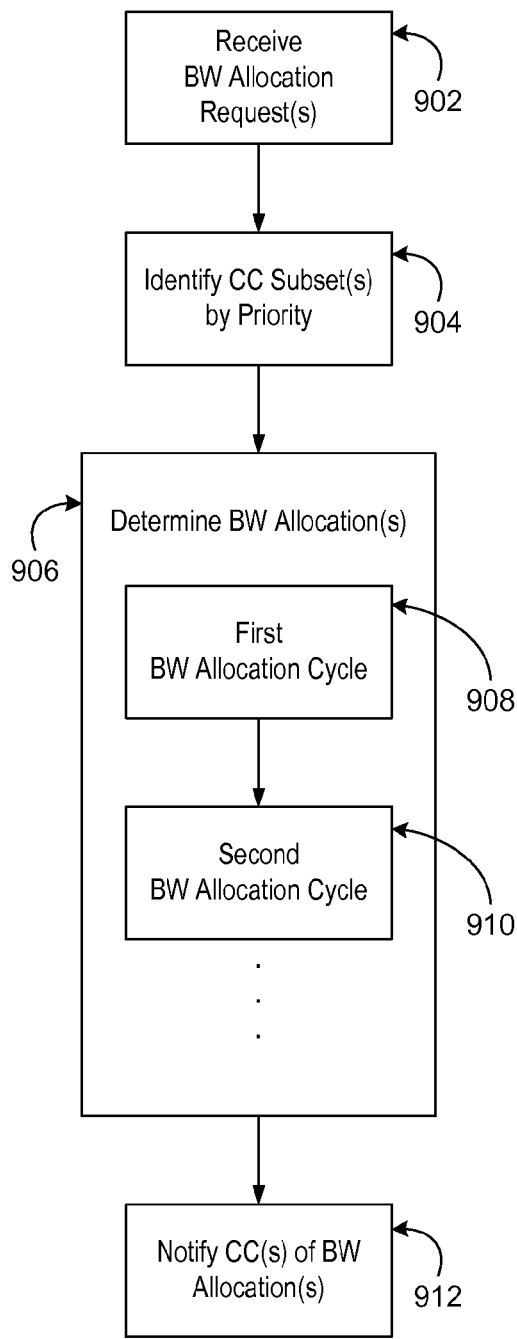
FIG. 9 is a flowchart depicting still further example steps for managing DQoS in accordance with some embodiments of the present invention.

FIG. 9 depicts example steps that may be performed by the bandwidth manager 602 (FIG. 6) to determine bandwidth allocations for compound carousels 604, 606, 608. At step 902, the bandwidth manager 602 may receive one or more bandwidth allocation requests from one or more of the compound carousels 604, 606, 608. At step 904, one or more subsets of the compound carousels 604, 606, 608 may be identified based at least on a priority level of respective datacast sessions associated with the compound carousels 604, 606, 608. For example, each of the compound carousels associated with a highest priority level datacast session (i.e., highest priority compound carousels) may be identified as a highest priority subset, and similarly for each distinct priority level.

At step 906, a bandwidth allocation may be determined for each of the compound carousels 604, 606, 608 (FIG. 6). As depicted in FIG. 9, step 906 may include a plurality of bandwidth allocation cycles 908, 910, etc. For example, different ones of the bandwidth allocation cycles 908, 910 may at least partially allocation the available bandwidth for the server platform 102 (FIG. 1) in a prioritized manner based at least in part on the subsets of compound carousels identified at step 904. Examples of bandwidth allocation cycles in accordance with some embodiments of the present invention are described below in more detail. At step 912, the bandwidth manager 902 may send bandwidth allocation notifications to one or more of the compound carousels 604, 606, 608. As described above, the number of compound carousels 604, 606, 608 receiving bandwidth allocation notification may be larger than the number that sent bandwidth allocation requests received at step 902.

In what follows, each compound carousel $CC_i$ is assumed to be associated with a datacast session specifying at least a normal bandwidth guideline $BWNorm_i$, a maximum bandwidth guideline $BWMax_i$, a minimum bandwidth guideline $BWMin_i$ and a priority level $PRI_i$. For example, bandwidth guidelines may be specified as a bit rate, and priority levels may be specified as a value chosen from an enumerated set, an integer, a real number, and/or a suitable combination thereof. The available bandwidth parameter BWA indicates unallocated available bandwidth (e.g., unallocated by the bandwidth manager 602 of FIG. 6) at any given point in the multi-cycle bandwidth allocation process.

Figure 10:
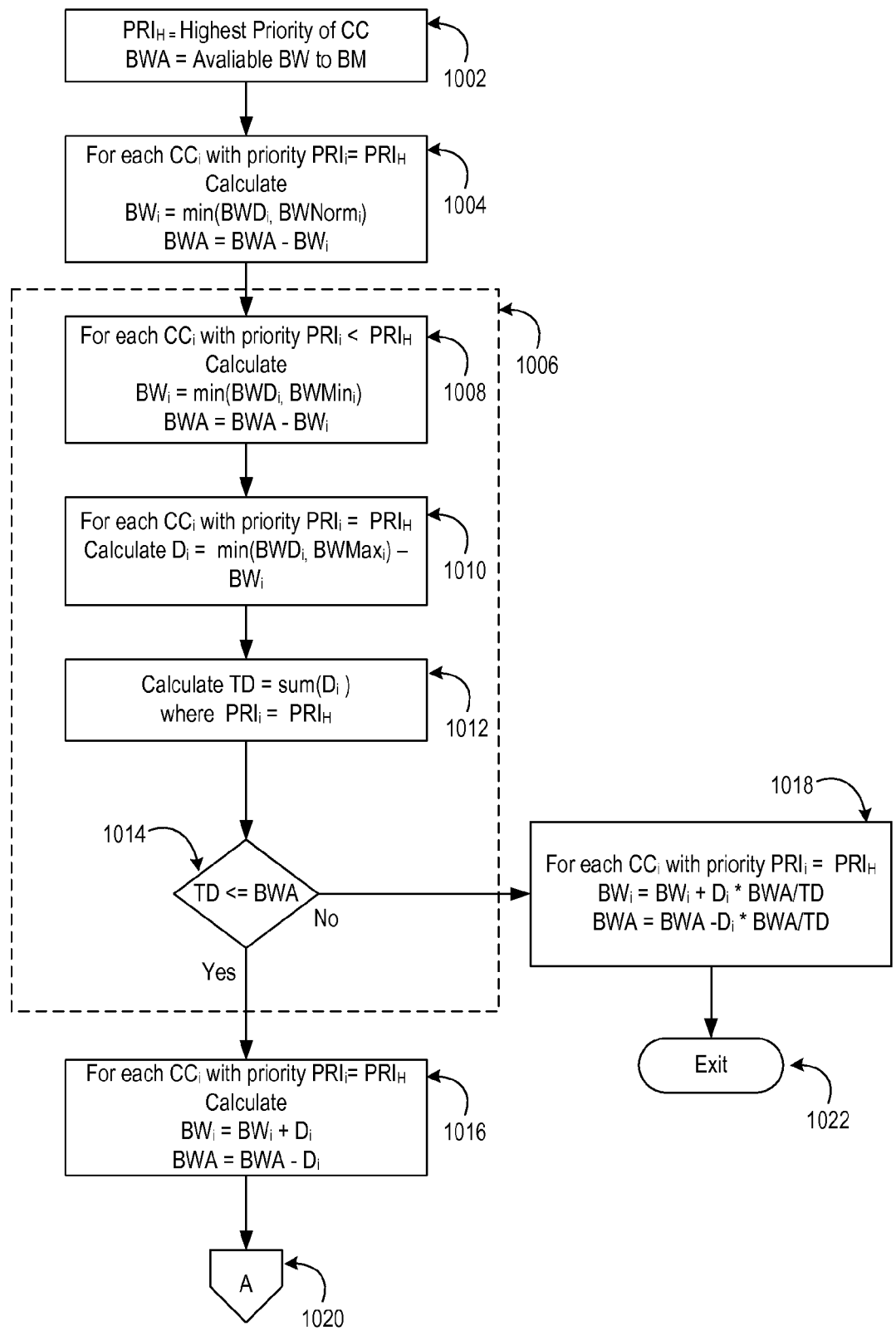
FIG. 10 is a flowchart depicting example steps for a highest priority bandwidth allocation cycle in accordance with some embodiments of the present invention.

FIG. 10 depicts example steps for a highest priority bandwidth allocation cycle in accordance with some embodiments of the present invention. For example, the highest priority bandwidth allocation cycle may correspond to the first bandwidth allocation cycle 908 of FIG. 9. At step 1002, the highest active priority $PRI_H$ of a compound carousel (CC) may be found by finding the highest-priority compound carousel requesting non-zero desired bandwidth. An allocation subcycle (step 1004) tries to satisfy normal BW for normal sessions. In this subcycle, the minimum of the desired bandwidth $BWD_i$ and the normal bandwidth $BWNorm_i$ of each compound carousel $CC^i$ at highest priority (i.e., the highest priority subset of compound carousels) is allocated to the compound carousel $CC_i$, and the value is stored in $BW_i$ (i.e., the bandwidth currently allocated to compound carousel $CC_i$), and the total bandwidth available to the bandwidth manager BWA is reduced by $BW_i$.

One or more steps 1006 may determine if there is sufficient available bandwidth BWA to increase the bandwidth allocation $BW_i$ for each of the highest priority subset of compound carousels to the maximum bandwidth guideline $BWMax_i$. A next allocation subcycle (step 1008) tries to satisfy the minimum bandwidth requirements for preempted sessions (i.e., compound carousels associated with datacast sessions having priority levels lower than the highest). In this cycle, the minimum of the desired bandwidth $BWD_i$ and the minimum bandwidth $BWMin_i$ of each compound carousel $CC_i$ with priority lower than the highest priority is allocated to the compound carousel $CC_i$, and the value is stored in $BW_i$, and the total bandwidth available to the bandwidth manager BWA is reduced by $BW_i$. Note that the subsets of compound carousels in these subcycles (i.e., steps 1004 and 1008) are disjoint and together form a complete set of all the compound carousels managed by the bandwidth manager.

A next subcycle of allocation (steps 1010, 1012, 1014, 1016 and 1018) tries to satisfy the highest priority sessions with the desired bandwidth. At step 1010, all compound carousel with the highest priority are found and for each of the found compound carousel $CC^i$ calculate the delta $D_i$ of the minimum of the desired bandwidth $BWD_i$ and maximum bandwidth $BWMax_i$, and the bandwidth $BW_i$ previously allocated. At step 1012, the sum of all the deltas TD is calculated. At step 1014, the total delta TD is compared to the remaining bandwidth BWA available to the bandwidth manager. If the total delta TD is less than or equal to the remaining bandwidth, there is enough bandwidth remaining to satisfy the desired bandwidth requirement for all compound carousel at highest priority. In step 1016, each compound carousel $CC_i$ is allocated additional bandwidth $D_i$ and the total remaining bandwidth BWA is reduced by the same amount. The algorithm may move on to a next allocation cycle (e.g., via diagrammatic connector 1020). If the total delta TD is greater than the remaining bandwidth, there is not enough bandwidth remaining to satisfy the desired bandwidth requirement for all compound carousels at highest priority. At step 1018, the remaining bandwidth is allocated to each compound carousel $CC_i$ at the highest priority in proportion to its desired bandwidth $D_i$. There are other variations of this algorithm to allocate the remaining bandwidth to the compound carousels, for example, allocating the remaining bandwidth evenly to each compound carousel at highest priority disregarding its desired bandwidth. Since there is no more remaining bandwidth available after this allocation, the allocation algorithm may terminate 1022.

Figure 11:
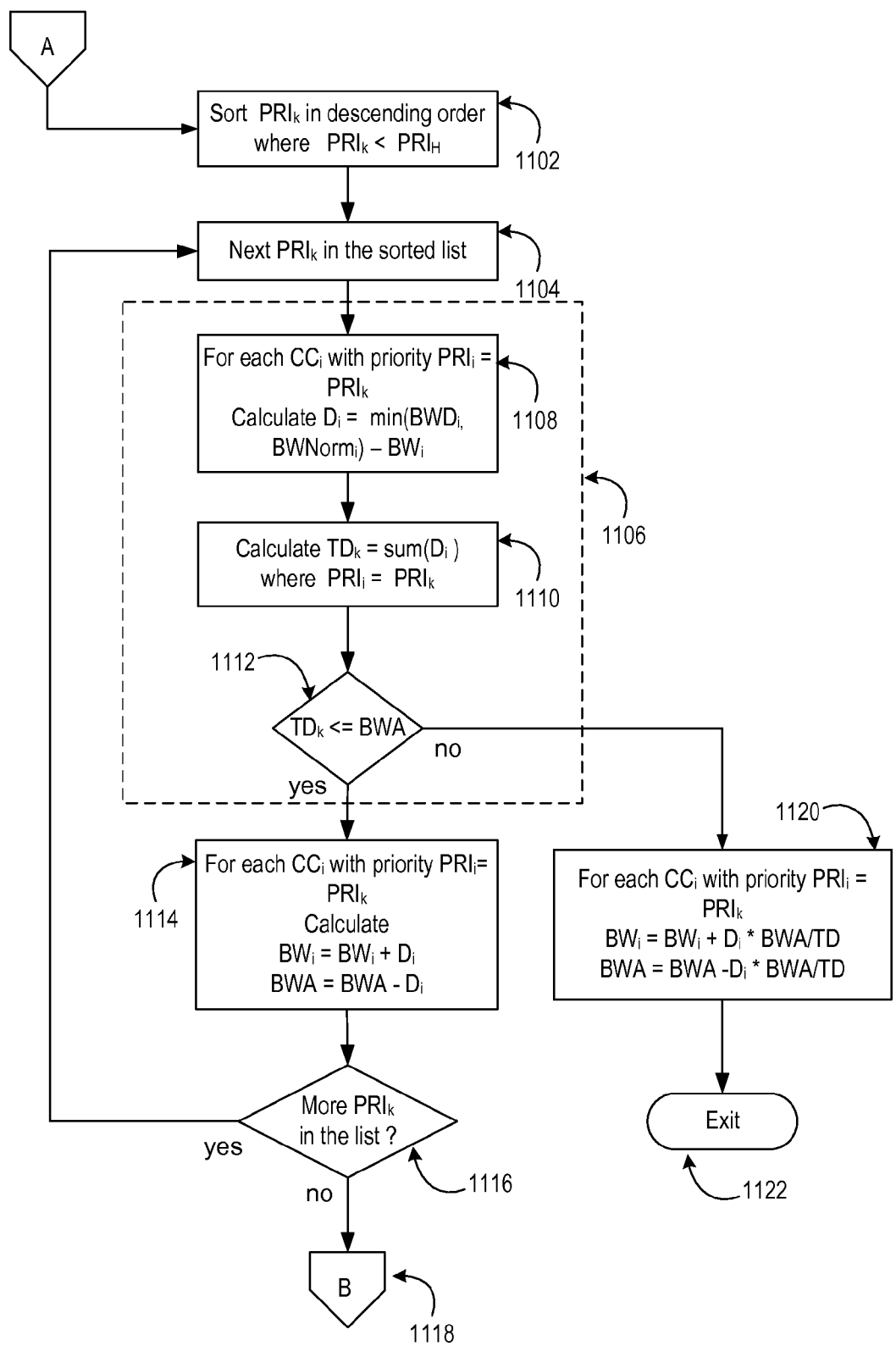
FIG. 11 is a flowchart depicting example steps for a normal bandwidth allocation cycle in accordance with some embodiments of the present invention.

In a further normal bandwidth allocation cycle, the algorithm tries to allow sessions at lower priority to get desired bandwidth, but no more than normal. FIG. 11 depicts example steps for a normal bandwidth allocation cycle in accordance with some embodiments of the present invention. At step 1102, all compound carousel priority levels with priority lower than the highest priority are found and sorted in descending order. At step 1104, a next (e.g., a first) priority level $PRI_k$ lower than the highest priority is found from the list. Each priority level $PRI_k$ corresponds to a subset of compound carousels. One or more steps 1106 may determine if there is sufficient available bandwidth BWA to increase the bandwidth allocation $BW_i$ for each of the current priority subset of compound carousels to the normal bandwidth guideline $BWNorm_i$.

At step 1108, for each of the found compound carousel $CC_i$ with priority equal to $PRI_k$, calculate the delta $D_i$ of the minimum of the desired bandwidth $BWD_i$ and normal bandwidth $BWNorm_i$, and the bandwidth $BW_i$ allocated in one or more previous cycles. At step 1110, the sum of all the deltas TD is calculated. At step 1112, the total delta TD is compared to the remaining bandwidth BWA available to the bandwidth manager. If the total delta TD is less than or equal to the remaining bandwidth, there is enough bandwidth remaining to allow sessions at this priority level $PRI_k$ to get desired bandwidth, but no more than normal. At step 1114, each compound carousel $CC^i$ is allocated additional bandwidth $D_i$ and the total remaining bandwidth BWA is reduced by the same amount. At step 1116, the list found at step 1102 is examined to see if any priory level $PRI_k$ left in the list. If there is no more priority level left unallocated, the algorithm may continue to the next allocation cycle (e.g., via diagrammatic connector 1118). Otherwise the next priority level $PRI_k$ is picked and steps 1108, 1110, 1112, 1114 may be repeated. If the total delta TD is greater than the remaining bandwidth, there is not enough bandwidth remaining to satisfy the desired bandwidth requirement for all compound carousel at this priority. At step 1120, the remaining bandwidth is allocated to each compound carousel $CC_i$ at this priority in proportion to its desired bandwidth $D_i$. Note that there are other variances of algorithm to allocate the remaining bandwidth to the compound carousels, for example, allocating the remaining bandwidth evenly to each compound carousel at this priority regardless of its desired bandwidth. Since there is no more remaining bandwidth available after this allocation, the algorithm may terminate 1122.

Figure 12:
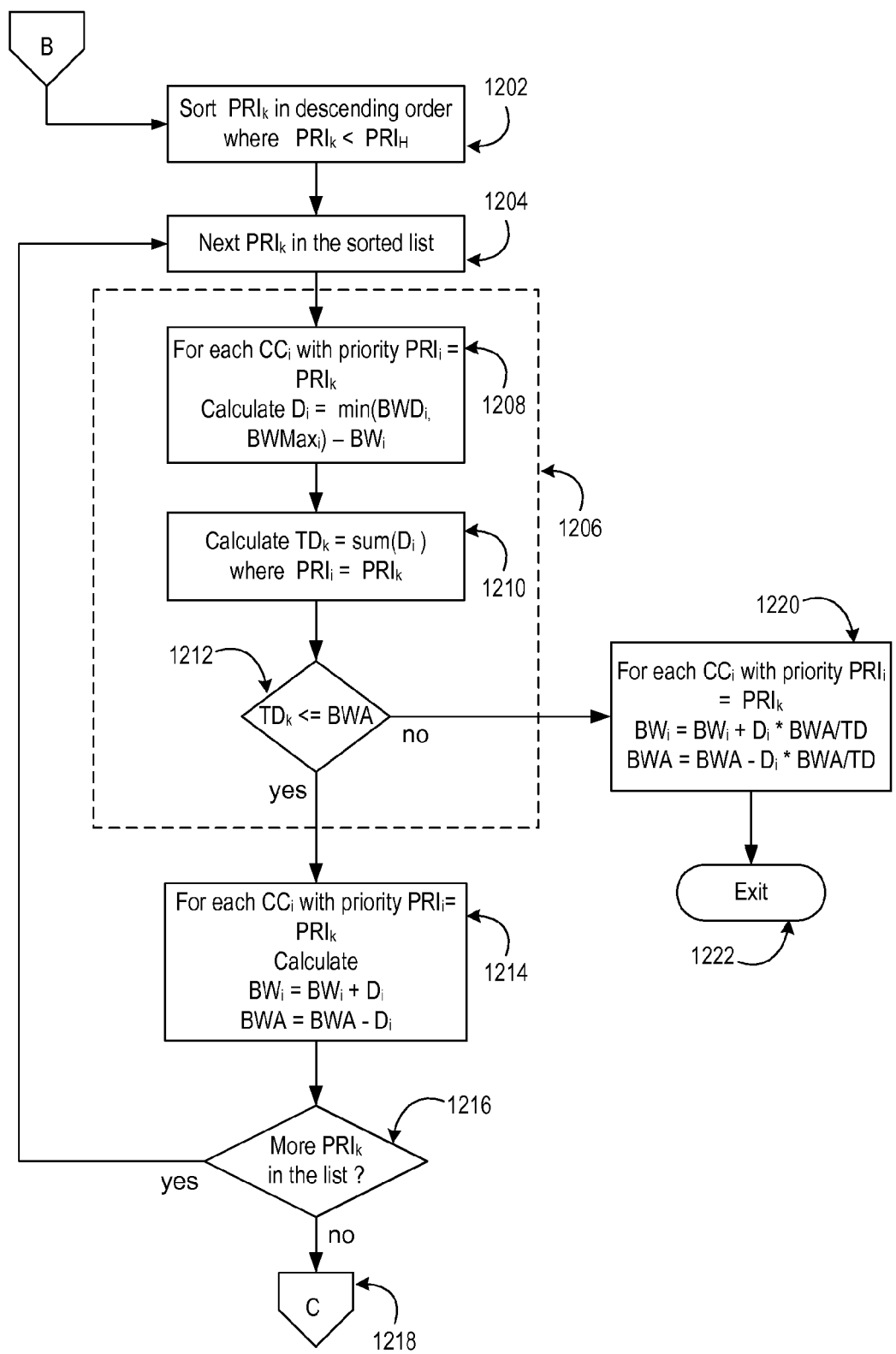
FIG. 12 is a flowchart depicting example steps for a desired bandwidth allocation cycle in accordance with some embodiments of the present invention.

In a further desired bandwidth allocation cycle, the algorithm tries to allow sessions at lower priority to get desired bandwidth, even if higher than normal. The bandwidth allocation is bounded by the maximum bandwidth of each compound carousel. FIG. 12 depicts example steps for a desired bandwidth allocation cycle in accordance with some embodiments of the present invention. At step 1202, all compound carousel priority levels with priority lower than the highest priority are found and sorted in descending order. At step 1204, a next (e.g., a first) priority level $PRI_k$ lower than the highest priority is found from the list. Each priority level $PRI_k$ corresponds to a subset of compound carousels. One or more steps 1206 may determine if there is sufficient available bandwidth BWA to increase the bandwidth allocation $BW_i$ for each of the current priority subset of compound carousels to its desired bandwidth.

At step 1208, for each of the found compound carousel $CC_i$ with priority equal to $PRI_k$, calculate the delta $D_i$ of the minimum of the desired bandwidth $BWD_i$ and normal bandwidth $BWMax_i$, and the bandwidth $BW_i$ allocated in previous cycles. At step 1210, the sum of all the deltas TD is calculated. At step 1212, the total delta TD is compared to the remaining bandwidth BWA available to the bandwidth manager. If the total delta TD is less than or equal to the remaining bandwidth, there is enough bandwidth remaining to allow sessions at this priority level $PRI_k$ to get desired bandwidth, but no more than maximum. At step 1214, each compound carousel $CC_i$ is allocated additional bandwidth $D_i$ and the total remaining bandwidth BWA is reduced by the same amount. At step 1216, the list found at step 1202 is examined to see if any priory level $PRI_k$ left in the list. If there is no more priority level left unallocated, the algorithm may continue to the next allocation cycle (e.g., via diagrammatic connector 1218). Otherwise the next priority level $PRI_k$ is picked and steps 1208, 1210, 1212, 1214, 1216 may be repeated. If the total delta TD is greater than the remaining bandwidth, there is not enough bandwidth remaining to satisfy the desired bandwidth requirement for all compound carousel at this priority. At step 1220, the remaining bandwidth is allocated to each compound carousel $CC_i$ at this priority in proportion to its desired bandwidth $D_i$. Note that there are other variations of the algorithm to allocate the remaining bandwidth to the compound carousels, for example, allocate the remaining bandwidth evenly to each compound carousel at this priority regardless of its desired bandwidth. Since there is no more remaining bandwidth available after this allocation, the algorithm may terminate 1222.

Figure 13:
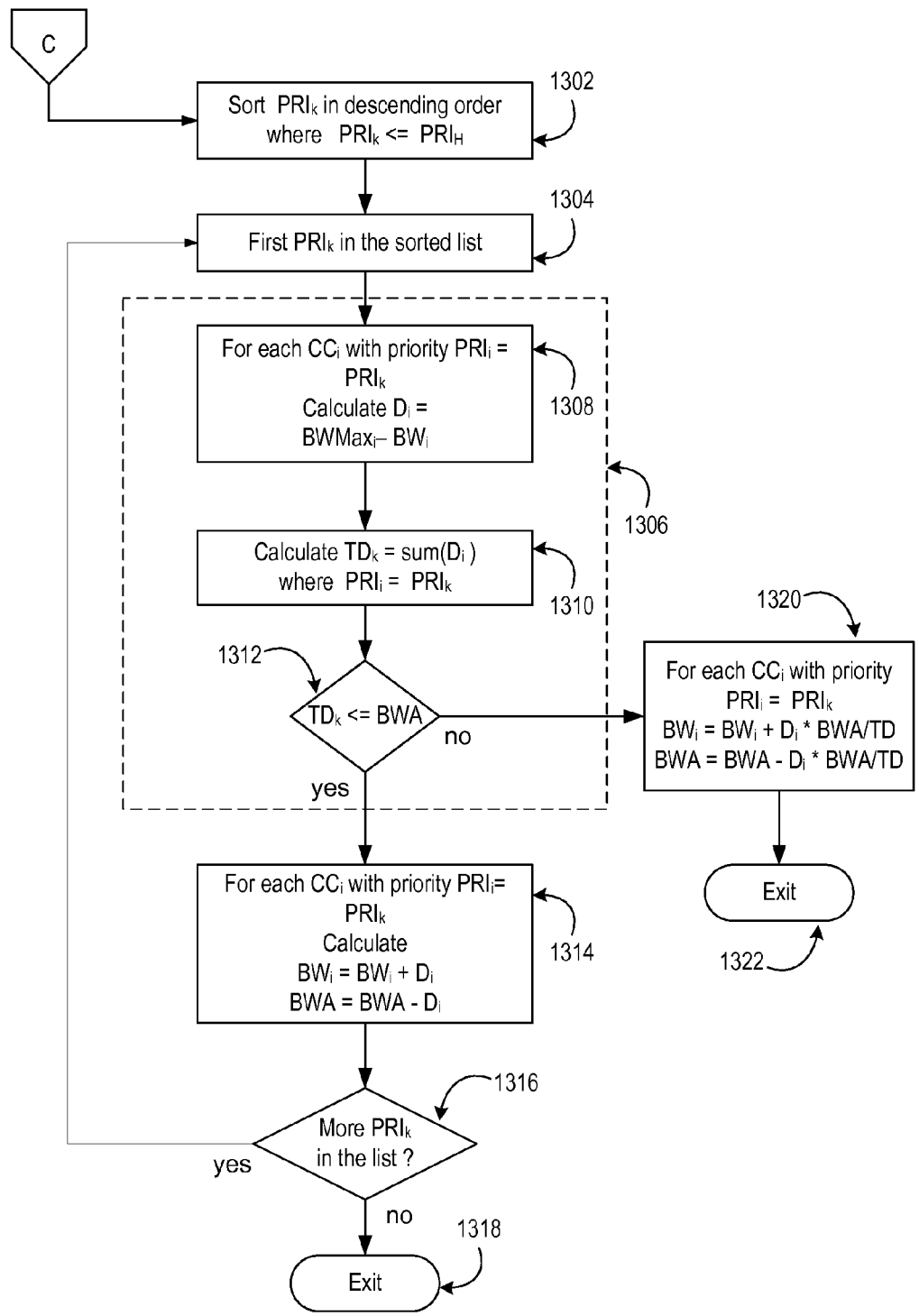
FIG. 13 is a flowchart depicting example steps for a maximum bandwidth allocation cycle in accordance with some embodiments of the present invention.

In a further maximum bandwidth allocation cycle, the algorithm tries to allow sessions to get maximum bandwidth, starting from the highest priority level, until all sessions get the maximum bandwidth or the available bandwidth is exhausted. FIG. 13 depicts example steps for a maximum bandwidth allocation cycle in accordance with some embodiments of the present invention. At step 1302, all compound carousel priority levels are found and sorted in descending order. At step 1304, a next (e.g., a first) priority level $PRI_k$ lower than the highest priority is found from the list. Each priority level $PRI_k$ corresponds to a subset of compound carousels. One or more steps 1306 may determine if there is sufficient available bandwidth BWA to increase the bandwidth allocation $BW_i$ for each of the current priority subset of compound carousels to its maximum bandwidth guideline $BWMax_i$.

At step 1308, for each of the found compound carousel $CC_i$ with priority equal to $PRI_k$, calculate the delta $D_i$ of the maximum bandwidth $BWMax_i$, and the bandwidth $BW_i$ allocated in previous cycles. At step 1310, the sum of all the deltas TD is calculated. At step 1312, the total delta TD is compared to the remaining bandwidth BWA available to the bandwidth manager. If the total delta TD is less than or equal to the remaining bandwidth, there is enough bandwidth remaining to allow sessions at this priority level $PRI_k$ to get the maximum bandwidth. At step 1314, each compound carousel $CC^i$ is allocated additional bandwidth $D_i$ and the total remaining bandwidth BWA is reduced by the same amount. Note that this will bring the total bandwidth allocated to the maximum bandwidth of the compound carousel $CC_i$. At step 1316, the list found At step 1302 is examined to see if any priory level $PRI_k$ left in the list. If there is no more priority level left unallocated, the algorithm may terminate 1318 and the remaining bandwidth will be left unallocated. Otherwise the next priority level $PRI_k$ is picked and steps 1308, 1310, 1312, 1314, 1316 may be repeated. If the total delta TD is greater than the remaining bandwidth, there is not enough bandwidth remaining to satisfy the maximum bandwidth requirement for all compound carousel at this priority. At step 1320, the remaining bandwidth is allocated to each compound carousel $CC_i$ at this priority in proportion to its desired bandwidth $D_i$. Note that there are other variations of the algorithm to allocate the remaining bandwidth to the compound carousels, for example, allocate the remaining bandwidth evenly to each compound carousel at this priority regardless of its desired bandwidth. Since there is no more remaining bandwidth available after this allocation, the algorithm may terminate 1322.

Figure 14:
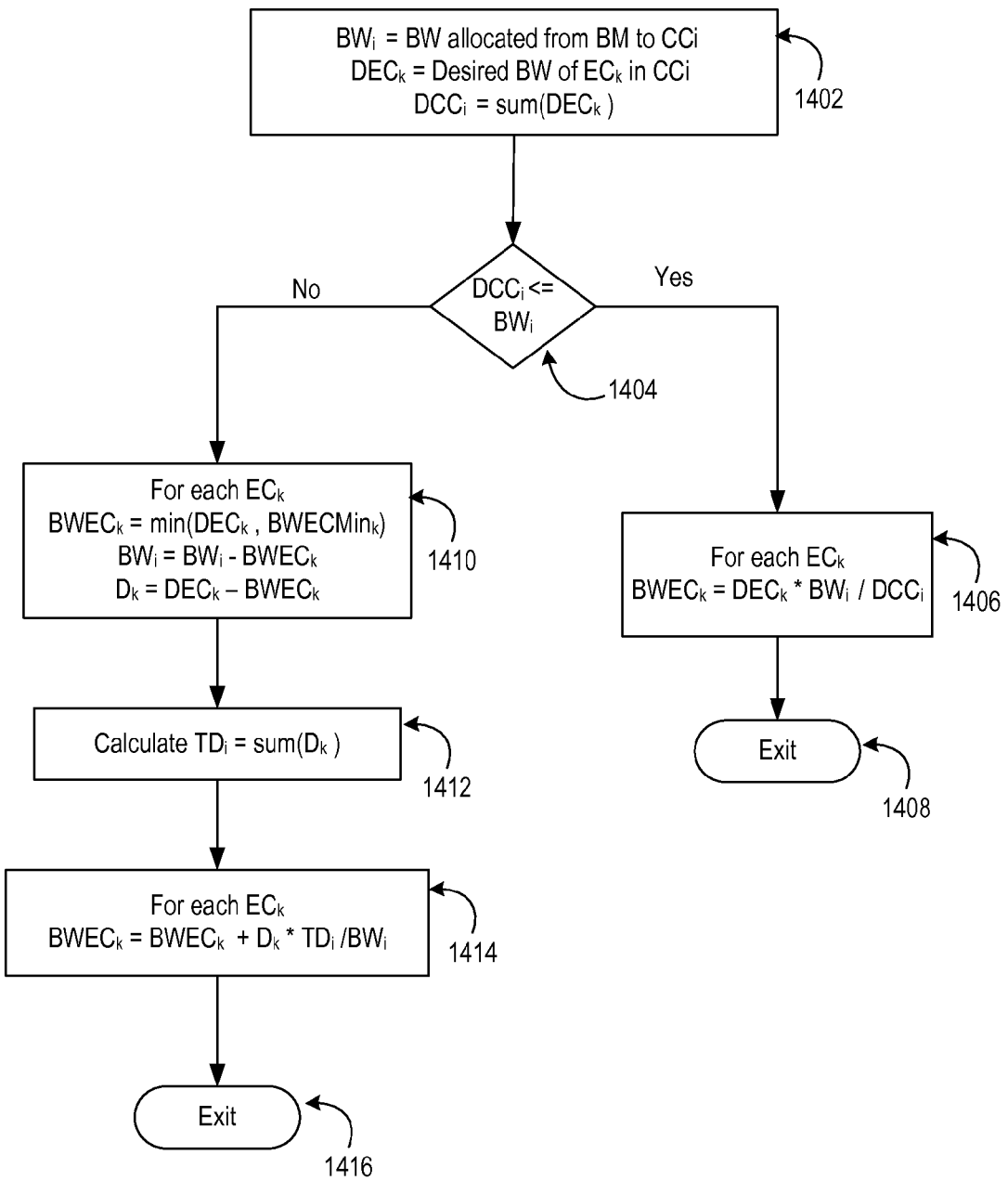
FIG. 14 is a flowchart depicting example steps for distributing a bandwidth allocation to elementary carousels in accordance with some embodiments of the present invention.

As described above with reference to FIG. 7, once a bandwidth allocation is determined for a compound carousel $CC_i$ the compound carousel may distribute the allocated bandwidth among its elementary carousels $EC_k$. FIG. 14 depicts example steps for distributing a bandwidth allocation to elementary carousels in accordance with some embodiments of the present invention. At step 1402, the compound carousel $CC_i$ has bandwidth allocation $BW_i$, for example, allocated to the compound carousel by the bandwidth manager as described above. In this example, the desired bandwidth of the compound carousel $DCC_i$ is the sum of all desired bandwidth $DEC_k$ of each elementary carousel $EC_k$ within the compound carousel $CC_i$. At step 1404, the allocated bandwidth $BW_i$ is compared to the desired bandwidth $DCC_i$. If the allocated bandwidth $BW_i$ is larger than the desired bandwidth $DCC_i$ then the desired bandwidth of each elementary carousel $EC_k$ can be satisfied. At step 1406, all the available bandwidth is allocated to each elementary carousel $EC_k$ in proportion to the desired bandwidth $DCC_k$. Note that in this case the bandwidth $BWEC_k$ allocated to each elementary carousel $EC_k$ may be larger than the desired bandwidth $DCC_k$. The algorithm may then terminate 1408.

If the allocated bandwidth $BW_i$ is smaller than the desired bandwidth $DCC_i$, then the desired bandwidth of each elementary carousel $EC_k$ cannot be satisfied. The algorithm tries to allocate the minimum bandwidth to each elementary carousel $EC_k$ plus a fair share of the remaining bandwidth. At step 1410, each elementary carousel $EC_k$ is allocated with the minimum of the desired bandwidth $DEC_k$ and the minimum bandwidth $BWECMin_k$ of the elementary carousel, the available bandwidth $BW_i$ is reduced by the same amount, and the delta $D_k$ of the desired bandwidth $DEC_k$ and the allocated bandwidth $BWEC_k$ is calculated. At step 1412, the total of the deltas $TD_i$ is calculated. At step 1414, the remaining bandwidth is allocated to each elementary carousel in proportion to the desired bandwidth of each elementary carousel. After all the bandwidth is allocated, the algorithm may terminate 1416.

Figure 15:
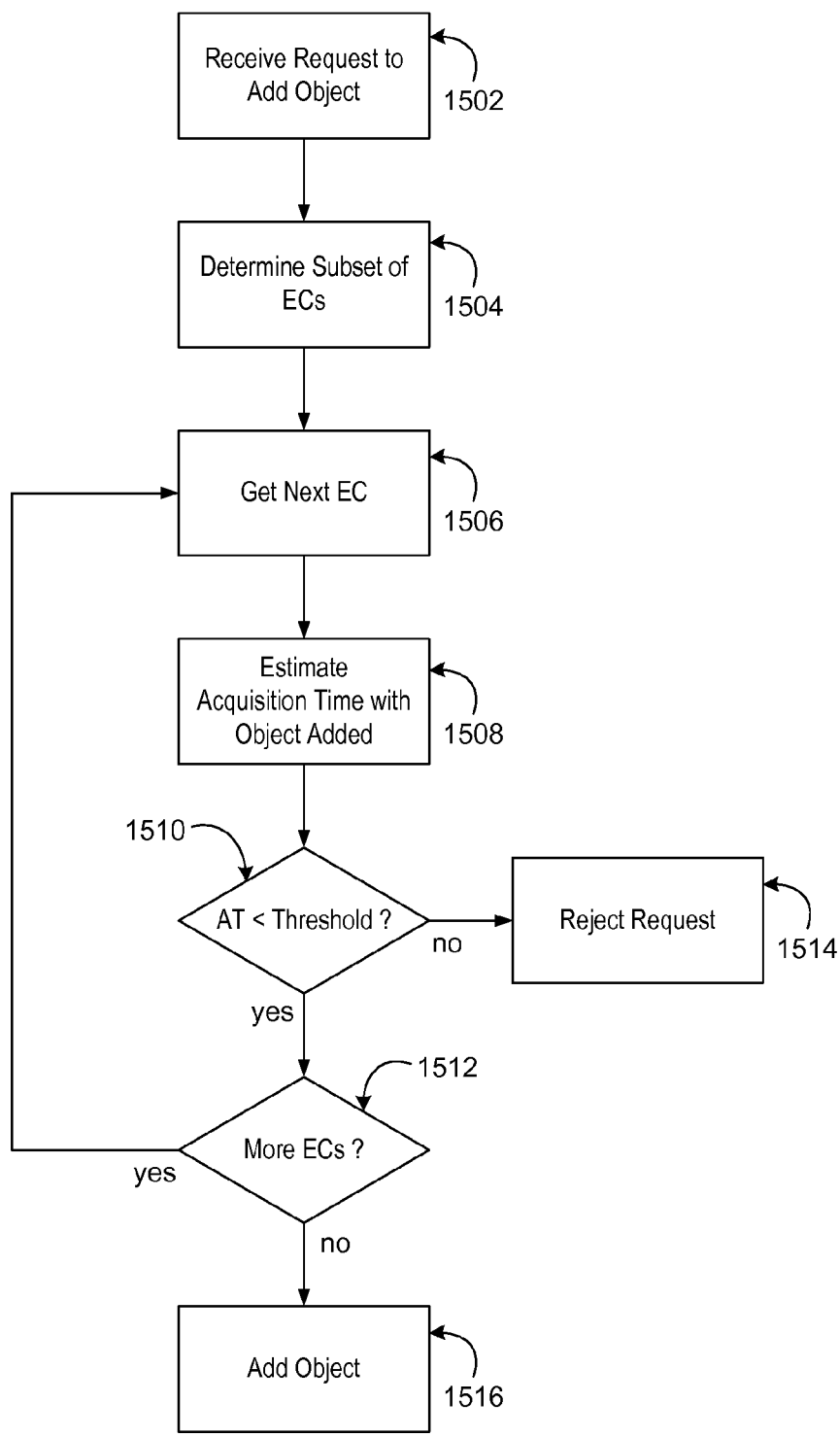
FIG. 15 is a flowchart depicting example steps for intake policing in accordance with some embodiments of the present invention.

As described above with reference to FIG. 3, it may be that a new data object cannot be added to a datacast session and/or compound carousel without violating a QoS threshold. Accordingly it may be desirable for the server platform 102 (FIG. 1) to incorporate intake policing with respect to data objects. FIG. 15 depicts example steps for intake policing in accordance with some embodiments of the present invention. At step 1502, a request to add a data object may be received. For example, the server platform 102 may receive the request from the server application 148. The server platform 102 may route the request to a particular one of the compound carousels 104. Alternatively, the server application 148 may have direct reference to the appropriate compound carousel and may make the request of the compound carousel directly.

The compound carousel may include one or more elementary carousels. Some subset (including all) of the elementary carousels may be affected by the addition of the new object. At step 1504, the affected subset of elementary carousels may be determined. For example, the compound carousel may determine the affected subset in accordance with its policies. At step 1506, a next one (e.g., a first one) of the subset of elementary carousels may be selected. At step 1508, an estimate for data object acquisition time with the data object of step 1502 added (the hypothetical acquisition time) may be determined. For example, the hypothetical acquisition time may be estimated at least in part by dividing a total amount of data that would be loaded on the elementary carousel with the new data object added by a normal bandwidth guideline for the elementary carousel.

At step 1510, the hypothetical acquisition time (AT) may be compared with an acquisition time threshold for the elementary carousel. For example, the acquisition time threshold may be set as the target acquisition time for the elementary carousel (e.g., determined as described above) multiplied by an acquisition time relaxation factor. The acquisition time relaxation factor may be a configuration parameter of the compound carousel containing the elementary carousel. If the hypothetical acquisition time is less than the acquisition time threshold, a procedure incorporating step 1510 may progress to step 1512. Otherwise, the procedure may progress to step 1514.

At step 1512, it may be determined whether there are more elementary carousels in the affected subset. If so, the procedure may return to step 1506 to select the next elementary carousel for checking Otherwise, the procedure may progress to step 1516. If one of the affected subset of elementary carousels fails the test of step 1510, the request of step 1502 may be rejected at step 1514. Otherwise, the request may be accepted and the data object added to each of the elementary carousels in the affected subset at step 1516.

Figure 16:
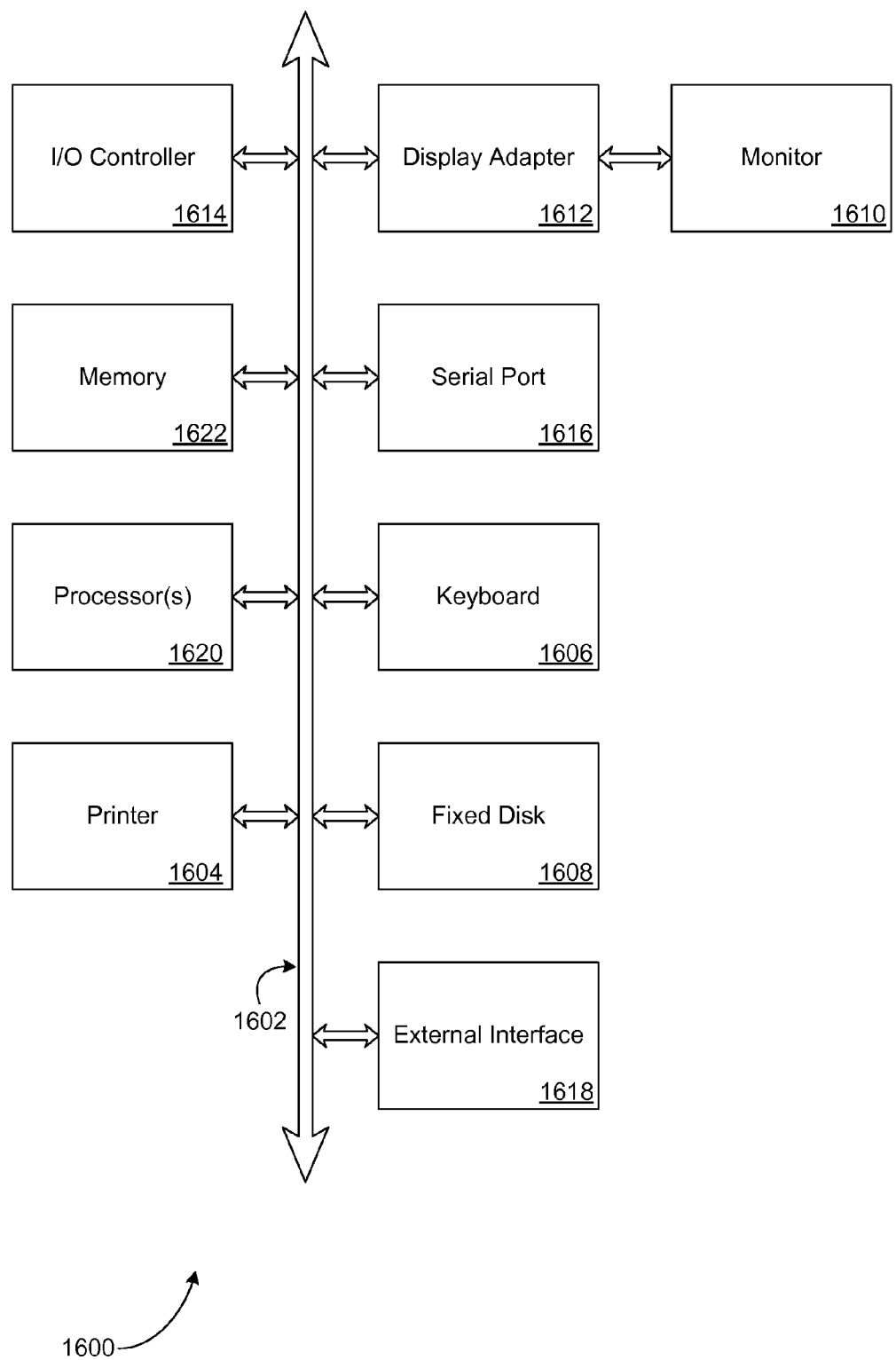
FIG. 16 is a schematic diagram depicting aspects of an example computer device in accordance with some embodiments of the present invention.

In accordance with at least some embodiments, the system, apparatus, methods, processes and/or operations for managing and efficiently datacasting data objects may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 16 depicts aspects of elements that may be present in a computer device and/or system 1600 configured to implement a method and/or process in accordance with some embodiments of the present invention. The subsystems shown in FIG. 16 are interconnected via a system bus 1602. Additional subsystems such as a printer 1604, a keyboard 1606, a fixed disk 1608, a monitor 1610, which is coupled to a display adapter 1612. Peripherals and input/output (I/O) devices, which couple to an I/O controller 1614, can be connected to the computer system by any number of means known in the art, such as a serial port 1616. For example, the serial port 1616 or an external interface 1618 can be utilized to connect the computer device 1600 to further devices and/or systems not shown in FIG. 16 including a wide area network such as the Internet, a mouse input device, and/or a scanner. The interconnection via the system bus 1602 allows one or more processors 1620 to communicate with each subsystem and to control the execution of instructions that may be stored in a system memory 1622 and/or the fixed disk 1608, as well as the exchange of information between subsystems. The system memory 1622 and/or the fixed disk 1608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

What is claimed is:

1. A datacasting apparatus, comprising:
a plurality of compound carousels associated with a plurality of datacast sessions, each datacast session having session parameters comprising a priority level and at least one bandwidth guideline;
a bandwidth manager configured to, at least:
receive a bandwidth allocation request specifying at least a desired bandwidth from each of the plurality of compound carousels;
identify a plurality of subsets of the plurality of compound carousels based at least on the priority levels of the plurality of datacast sessions;
determine a bandwidth allocation for each of the plurality of compound carousels based at least on a plurality of bandwidth allocation cycles, each bandwidth allocation cycle comprising an at least partial allocation of an available bandwidth among each compound carousel in one of the plurality of identified subsets of the plurality of compound carousels, each at least partial allocation based at least on corresponding subsets of desired bandwidths and bandwidth guidelines; and
notify each of the plurality of compound carousels of its determined bandwidth allocation; and
one or more processors collectively facilitating at least the plurality of compound carousels and the bandwidth manager.

2. A datacasting apparatus according to claim 1, wherein:
each compound carousel comprises at least one elementary carousel; and
each compound carousel is configured at least to allocate the determined bandwidth allocation to said at least one elementary carousel independent of interaction with the bandwidth manager.

3. A datacasting apparatus according to claim 1, wherein:
each compound carousel comprises at least one elementary carousel; and
the bandwidth manager is further configured at least to allocate the determined bandwidth allocation for each compound carousel among said at least one elementary carousel of the compound carousel.

4. A computer-implemented method for datacasting, comprising:
receiving, with at least one computing apparatus, a bandwidth allocation request specifying at least a desired bandwidth from each of a plurality of compound carousels associated with a plurality of datacast sessions each having session parameters comprising a priority level and at least one bandwidth guideline;
identifying, with said at least one computing apparatus, a plurality of subsets of the plurality of compound carousels based at least on the priority levels of the plurality of datacast sessions;
determining, with said at least one computing apparatus, a bandwidth allocation for each of the plurality of compound carousels based at least on a plurality of bandwidth allocation cycles, each bandwidth allocation cycle comprising an at least partial allocation of an available bandwidth among each compound carousel in one of the plurality of identified subsets of the plurality of compound carousels, each at least partial allocation based at least on corresponding subsets of desired bandwidths and bandwidth guidelines; and
notifying, with said at least one computing apparatus, each of the plurality of compound carousels of its determined bandwidth allocation.

5. A computer-implemented method according to claim 4, wherein:
the plurality of subsets of the plurality of compound carousels comprises a highest priority subset in which each compound carousel is associated with one of the plurality of datacast sessions having a highest priority level; and the plurality of bandwidth allocation cycles comprises a highest priority bandwidth allocation cycle in which, at least, each compound carousel in the highest priority subset is allocated at least a portion of the available bandwidth in accordance with at least said at least one bandwidth guideline of the associated datacast session.

6. A computer-implemented method according to claim 5, wherein:

said at least one bandwidth guideline comprises:
a normal bandwidth;
a minimum bandwidth; and
a maximum bandwidth; and the highest priority bandwidth allocation cycle comprises:
allocating at least a portion of the available bandwidth to each compound carousel in the highest priority subset based at least on the desired bandwidth for the compound carousel and the normal bandwidth parameter of the associated datacast session;
allocating at least a portion of the available bandwidth to each of the plurality of compound carousels not in the highest priority subset based at least on the desired bandwidth for the compound carousel and the minimum bandwidth parameter of the associated datacast session; and
determining whether an unallocated portion of the available bandwidth is sufficient to increase the bandwidth allocation for each compound carousel in the highest priority subset in accordance with the maximum bandwidth parameter of the associated datacast session.

7. A computer-implemented method according to claim 4, wherein:

the plurality of subsets of the plurality of compound carousels comprises a plurality of lower priority subsets each corresponding to one of a plurality of datacast sessions each having a distinct priority level less than a highest priority level; and the plurality of bandwidth allocation cycles comprises a normal bandwidth allocation cycle that comprises determining whether an unallocated portion of the available bandwidth is sufficient to increase a current bandwidth allocation for each compound carousel in at least one of the plurality of lower priority subsets in accordance with a normal bandwidth parameter of the associated datacast session.

8. A computer-implemented method according to claim 7, wherein determining whether the unallocated portion of the available bandwidth is sufficient comprises determining an allocation delta for each compound carousel in said at least one of the plurality of lower priority subsets based on, at least:
the desired bandwidth specified for the compound carousel;
the normal bandwidth parameter of the associated datacast session; and
the current bandwidth allocation for the compound carousel as determined by at least one previous bandwidth allocation cycle.

9. A computer-implemented method according to claim 8, wherein the method further comprises, responsive to determining that the unallocated portion of the available bandwidth is insufficient, allocating the unallocated portion of the available bandwidth to each compound carousel in said at least one of the plurality of lower priority subsets in proportion to the allocation delta determined for the compound carousel.

10. A computer-implemented method according to claim 4, wherein:

the plurality of subsets of the plurality of compound carousels comprises a plurality of lower priority subsets each corresponding to one of a plurality of datacast sessions each having a distinct priority level less than a highest priority level; and the plurality of bandwidth allocation cycles comprises a desired bandwidth allocation cycle that comprises determining whether an unallocated portion of the available bandwidth is sufficient to increase a bandwidth allocation for each compound carousel in at least one of the plurality of lower priority subsets in accordance with the desired bandwidth specified for the compound carousel.

11. A computer-implemented method according to claim 10, wherein determining whether the unallocated portion of the available bandwidth is sufficient comprises determining an allocation delta for each compound carousel in said at least one of the plurality of lower priority subsets based on, at least:
the desired bandwidth specified for the compound carousel;
a maximum bandwidth parameter of the associated datacast session; and
the current bandwidth allocation for the compound carousel as determined by at least one previous bandwidth allocation cycle.

12. A computer-implemented method according to claim 4, wherein the plurality of bandwidth allocation cycles comprises a maximum bandwidth allocation cycle that comprises determining whether an unallocated portion of the available bandwidth is sufficient to increase a bandwidth allocation for each compound carousel in the plurality of subsets in accordance with a maximum bandwidth parameter of the associated datacast session.

13. A computer-implemented method according to claim 12, wherein determining whether the unallocated portion of the available bandwidth is sufficient comprises determining an allocation delta for each compound carousel in the plurality of subsets based at least on a difference between the maximum bandwidth parameter of the associated datacast session and the current bandwidth allocation for the compound carousel as determined by at least one previous bandwidth allocation cycle.

14. A computer-implemented method for datacasting, comprising:

determining, with at least one computing apparatus, a desired bandwidth for a compound carousel comprising a plurality of elementary carousels based at least on at least a subset of desired bandwidths for the plurality of elementary carousels;

requesting, with said at least one computing apparatus, a bandwidth allocation from a bandwidth manager for a plurality of compound carousels associated with a plurality of datacast sessions each having session parameters comprising a priority level;

receiving, with said at least one computing apparatus, a bandwidth allocation notification specifying at least the requested bandwidth allocation determined based at least on a plurality of bandwidth allocation cycles, each bandwidth allocation cycle comprising an at least partial allocation of an available bandwidth among each compound carousel in one of a plurality of subsets of the plurality of compound carousels, each subset of the plurality of compound carousels identified based at least on the priority levels of the plurality of datacast sessions; and determining, with said at least one computing apparatus, a bandwidth allocation for each of the plurality of elementary carousels based at least on said at least a subset of desired bandwidths for the plurality of elementary carousels.

15. A computer-implemented method according to claim 14, wherein the method further comprises:

receiving a request to add a data object to the compound carousel;

for each of at least a subset of the plurality of elementary carousels, determining an estimated acquisition time with the data object added;

determining whether each estimated acquisition time is less than an acquisition time threshold for the elementary carousel; and if so, adding the data object to each of said at least a subset of the plurality of elementary carousels.

16. A computer-implemented method according to claim 14, wherein:

the session parameters for the datacast session associated with the compound carousel further comprise a datacast session type; and the method further comprises determining at least one bandwidth guideline for each elementary carousel of the compound carousel based at least on the datacast session type.

17. A computer-implemented method according to claim 16, wherein:

the datacast session type comprises a rapid update datacast session type; and the method further comprises:

determining an acquisition time estimate for a base elementary carousel of the compound carousel based at least on a base maximum data size, an average update size, and an update interval; and determining an acquisition time estimate for an update elementary carousel of the compound carousel based at least on the acquisition time estimate for the base elementary carousel of the compound carousel.

18. A computer-implemented method according to claim 17, wherein the method further comprises:

determining a normal bandwidth guideline for the base elementary carousel based at least on the acquisition time estimate for the base elementary carousel and a worst case load assumption; and determining a normal bandwidth guideline for the update elementary carousel based at least on the acquisition time estimate for the update elementary carousel and the worst case load assumption.

19. A computer-implemented method according to claim 16, wherein:

the datacast session type comprises an outage victim datacast session type; and the method further comprises:

determining an acquisition time estimate for an event elementary carousel of the compound carousel based at least on an average event size, an event interval, and an outage coverage time; and determining an acquisition time estimate for an outage elementary carousel of the compound carousel based at least on the acquisition time estimate for the event elementary carousel of the compound carousel.

20. A computer-implemented method according to claim 16, wherein:

the datacast session type comprises a hybrid datacast session type; and the method further comprises:

determining an acquisition time estimate for a base elementary carousel of the compound carousel based at least on a base maximum data size, an average update size, an update interval, and an outage coverage time;

determining an acquisition time estimate for an update elementary carousel of the compound carousel based at least on the acquisition time estimate for the base elementary carousel of the compound carousel; and determining an acquisition time estimate for an outage elementary carousel of the compound carousel based at least on the acquisition time estimate for the base elementary carousel of the compound carousel.

* * * * *